US012403061B2

(12) United States Patent
Noda et al.

(10) Patent No.: US 12,403,061 B2
(45) Date of Patent: Sep. 2, 2025

(54) BODY WEIGHT LOAD REDUCTION DEVICE

(71) Applicant: Advanced Telecommunications Research Institute International, Kyoto (JP)

(72) Inventors: Tomoyuki Noda, Kyoto (JP); Tatsuya Teramae, Kyoto (JP); Asuka Takai, Kyoto (JP); Junichiro Furukawa, Kyoto (JP); Jun Morimoto, Kyoto (JP); Nao Nakano, Kyoto (JP)

(73) Assignee: Advanced Telecommunications Research Institute International, Kyoto (JP)

( * ) Notice: Subject to any disclaimer, the term of this patent is extended or adjusted under 35 U.S.C. 154(b) by 940 days.

(21) Appl. No.: 17/596,138

(22) PCT Filed: Jun. 5, 2020

(86) PCT No.: PCT/JP2020/022304

§ 371 (c)(1),
(2) Date: Dec. 3, 2021

(87) PCT Pub. No.: WO2020/246587

PCT Pub. Date: Dec. 10, 2020

(65) Prior Publication Data

US 2022/0241132 A1 Aug. 4, 2022

(30) Foreign Application Priority Data

Jun. 6, 2019 (JP) ................................ 2019-106469

(51) Int. Cl.
*A61H 3/00* (2006.01)

(52) U.S. Cl.
CPC ..... *A61H 3/008* (2013.01); *A61H 2201/1238* (2013.01); *A61H 2201/14* (2013.01);
(Continued)

(58) Field of Classification Search
CPC . A61H 3/008; A61H 3/04; A61H 3/00; A61H 1/0229; A61H 1/0262;
(Continued)

(56) References Cited

U.S. PATENT DOCUMENTS 8,083,695 B2 * 12/2011 Ashihara ................ B25J 9/0006
601/5
2009/0036815 A1 2/2009 Ido
(Continued)

FOREIGN PATENT DOCUMENTS

CN 101188991 A 5/2008
JP 2000-254184 A 9/2000
(Continued)

OTHER PUBLICATIONS

Chinese Office Action for Application No. 202080041671.6 dated Dec. 27, 2023, in 12 pages.
(Continued)

*Primary Examiner* — Rachel T Sippel
*Assistant Examiner* — Gwynneth L Howell
(74) *Attorney, Agent, or Firm* — Knobbe, Martens, Olson & Bear, LLP

(57) ABSTRACT

A body weight unloading apparatus according to an aspect of the present invention includes a first actuator, a second actuator, a first support member, a second support member, a sensor for measuring the imbalance between floor reaction forces respectively acting on the legs of a user, and a control device for controlling operations of the actuators. One end of the support members is respectively connected to the actuators, and the other end of the support members is fitted to the user such that unloading forces that are supplied by the actuators respectively act on the legs of the user. The control device controls the actuators so as to respectively generate
(Continued)

unloading forces determined according to the imbalance between the floor reaction forces.

13 Claims, 20 Drawing Sheets

(52) U.S. Cl.
CPC ................ *A61H 2201/5007* (2013.01); *A61H 2201/5061* (2013.01)

(58) Field of Classification Search
CPC .... A61H 2203/0481; A61H 2203/0487; A63B 69/0064; A63B 69/0028; A63B 69/0035; A63B 69/0037; A61B 5/112
See application file for complete search history.

(56) References Cited

U.S. PATENT DOCUMENTS

| | | | | |
|---|---|---|---|---|
| 2010/0256538 | A1 | 10/2010 | Ikeuchi | |
| 2010/0270771 | A1* | 10/2010 | Kobayashi | A61H 3/04 280/210 |
| 2011/0275043 | A1* | 11/2011 | Liu | A61H 3/04 434/247 |
| 2014/0058299 | A1 | 2/2014 | Sankai et al. | |
| 2014/0148738 | A1 | 5/2014 | Nagasaka et al. | |
| 2017/0027803 | A1* | 2/2017 | Agrawal | A61B 5/1122 |
| 2017/0312579 | A1* | 11/2017 | Nakashima | A63B 21/4011 |
| 2018/0140496 | A1 | 5/2018 | Sankai et al. | |
| 2021/0298984 | A1* | 9/2021 | Bulea | A61H 3/00 |

FOREIGN PATENT DOCUMENTS

| | | | |
|---|---|---|---|
| JP | 2005-342306 | A | 12/2005 |
| JP | 2007-330299 | A | 12/2007 |
| JP | 2009-195636 | A | 9/2009 |
| JP | 2014-184086 | A | 10/2014 |
| JP | 2014-195509 | A | 10/2014 |
| JP | 2015-144787 | A | 8/2015 |
| WO | WO 2012/118143 | A1 | 9/2012 |
| WO | WO 2016/186182 | A1 | 11/2016 |

OTHER PUBLICATIONS

International Search Report in PCT/JP2020/022304 issued Aug. 4, 2020.

Written Opinion of the International Searching Authority in PCT/JP2020/022304 issued Aug. 4, 2020.

* cited by examiner

BODY WEIGHT LOAD REDUCTION DEVICE

TECHNICAL FIELD

The present invention relates to a body weight unloading apparatus.

BACKGROUND ART

In order to restore the walking ability of individuals with gait impairments such as hemiplegic patients and elderly people who have difficulty walking on their own, for example, training programs for spontaneously generating a natural walking movement may be implemented. However, subjects who practice this walking movement fundamentally have difficulty supporting their weight on their own. As an example, hemiplegic patients have difficulty supporting the weight on their paralyzed side on their own. Thus, an apparatus (body weight unloading apparatus) configured to at least partially unload the body weight of the subject is utilized so that the subject can walk safely. For example, in clinical settings, a body weight unloading apparatus (body weight load reduction device) that lifts the body up vertically to support the body weight is used with subjects who walk on a treadmill. In recent years, body weight unloading apparatuses have also been developed for subjects who walk on a normal floor surface that at least partially unload the body weight of the subject while tracking the movement of the subject.

Patent Literature 1 and 2 propose fall prevention apparatuses and walking assist apparatuses that include a support member that provides support by hoisting the user up from above, and can be utilized in practicing such walking movement. Specifically, the fall prevention apparatuses proposed in Patent Literature 1 and 2 detect in advance that the user's body will collapse, based on variables such as the distance between the main body of the walking assist apparatus and the user. If it is detected that the user's body will collapse, the fall prevention apparatuses then prevent the user from falling by supporting the user's body with the support member. Furthermore, Patent Literature 1 and 2 propose providing an unloading member for unloading the user's body weight, in coordination with the support member. With these walking movement assist apparatuses, a subject who practices walking movement can be prevented from falling, and the body weight of the subject can be at least partially unloaded during the walking period.

CITATION LIST

Patent Literature

Patent Literature 1: JP 2005-342306A
Patent Literature 2: JP 2009-195636A

SUMMARY OF INVENTION

Technical Problem

The inventors found that problems such as the following occur with conventional body weight unloading apparatuses. That is, spontaneous torque in the leg joints plays an important role in order to perform a normal cyclic walking movement. In individuals with gait impairments, irregularities are caused in the cyclic gait, due to spontaneous torque decreasing in at least some of the joints. For example, in hemiplegic patients, the torque of the abductor and adductor of the hip joint on the paralyzed side is significantly reduced, resulting in a cyclic lateral inclination of the pelvis during walking, and thereby making it impossible to walk naturally. In the case where the function of one leg is reduced due to unilateral motor paralysis, sensory disturbance or the like, the walking impaired person tends to rely on their unaffected leg, and, as a result, he or she develops a gait that favors their unaffected side, and bilateral asymmetrical movement occurs when the person walks. The bilateral asymmetrical movement of walking causes skeletal and muscular asymmetry in the long term, thus making it even more difficult to relearn a natural gait that is bilaterally symmetrical.

In view of this, in order for the subject to practice a natural walking movement, it is preferable to approximate the subject's spontaneous gait to a natural gait, by independently and dynamically changing the unloading forces respectively acting on the legs during the walking period. For example, in the case of a hemiplegic patient, it is preferable to intervene in the cyclic lateral inclination of the pelvis that occurs during the walking period, by independently and dynamically changing the unloading forces respectively acting on the legs.

However, conventional body weight unloading apparatuses such as in Patent Literature 1 and 2 are provided with only one actuator for generating an unloading force that supports the subject's body weight, and the subject is only able to lift both sides of the body with the same force. Thus, with conventional body weight unloading apparatuses, it is difficult to independently and dynamically change the unloading forces on the subject's left and right legs during the walking period.

The present invention, in one aspect, was made in consideration of such points, and an object thereof is to provide a body weight unloading apparatus capable of independently and dynamically changing the unloading forces on the user's left and right legs during the walking period.

Solution to Problem

In order to solve the above problems, the present invention adopts the following configuration.

That is, a body weight unloading apparatus according to one aspect of the present invention is a body weight unloading apparatus for unloading a body weight of a user, including a first actuator, a second actuator, a first support member having a proximal end and a distal end, whereby the distal end is connected to the first actuator, and the proximal end is to be fitted to the user such that a first unloading force supplied by the first actuator acts on one leg of the user, a second support member having a proximal end and a distal end, whereby the distal end is connected to the second actuator, and the proximal end is to be fitted to the user such that a second unloading force supplied by the second actuator acts on the other leg of the user, a sensor configured to measure information indicating an imbalance between floor reaction forces respectively acting on the legs of the user, and a control device configured to control operations of the first actuator and the second actuator. The control device is configured to acquire the information indicating the imbalance between the floor reaction forces measured by the sensor, determine respective magnitudes of the first unloading force and the second unloading force, according to the imbalance between the floor reaction forces indicated by the acquired information, and control the first actuator and the second actuator, so as to generate the first unloading force and the second unloading force at the respectively determined magnitudes.

With the body weight unloading apparatus according to the above configuration, an actuator (first actuator) that supplies an unloading force (first unloading force) that acts on one of the user's legs and an actuator (second actuator) that supplies an unloading force (second unloading force) that acts on the other leg are provided separately. During the walking period, the imbalance between the floor reaction forces respectively acting on the user's legs is measured by the sensor. The control device then determines the magnitude of each unloading force, according to the measured imbalance between the floor reaction forces, and controls the operations of the actuators, so as to generate the unloading forces at the respectively determined magnitudes. That is, the unloading forces on the user's legs can be individually and dynamically adjusted, using the imbalance between the floor reaction forces during the walking period as an indicator. Accordingly, with the body weight unloading apparatus according to the above configuration, the unloading forces on the user's left and right legs can be independently and dynamically changed during the walking period.

Note that "one" corresponds to one of the left and right, and the "other" corresponds to the other of the left and right. For example, the one leg may be the leg on the right side, and the other leg may be the leg on the left side. Alternatively, the one leg may be the leg on the left side, and the other leg may be the leg on the right side. Similarly, the "first" corresponds to one of the left and right, and the "second" corresponds to the other of the left and right or the other. The number and type of actuators need not be particularly limited, and may be determined as appropriate according to the embodiment. Also, in the case where the actuators have two or more outputs, one of the output portions may be utilized as the "first actuator" and another output portion may be used as the "second actuator".

As long as the imbalance between the floor reaction forces can be measured, the type of sensor need not be particularly limited, and may be selected as appropriate according to the embodiment. A force sensor, a motion capture, a tilt sensor, a myoelectric sensor or a pressure distribution sensor, for example, may be used for the sensor. A load cell, for example, may be used for the force sensor. The tilt sensor may be constituted by an acceleration sensor and a gyro sensor, for example. The "leg" is the portion from the foot to the hip, and may also be referred to as the "lower limb". The "foot" is the portion from the ankle down (to the sole of the foot) and is the portion of the leg that contacts the ground. The "sole of the foot" is the surface of the foot that contacts the ground.

In the body weight unloading apparatus according to the above aspect, the imbalance between the floor reaction forces may be represented by a first ratio of the floor reaction force acting on the one leg to a total of the floor reaction forces acting on both legs, and a second ratio of the floor reaction force acting on the other leg to a total of the floor reaction forces acting on both legs. Also, determining the respective magnitudes of the first unloading force and the second unloading force may include determining the magnitude of the second unloading force according to the first ratio, and determining the magnitude of the first unloading force according to the second ratio. According to this configuration, the magnitude of the unloading force that is applied to the swing leg can be determined according to the floor reaction force on the support leg. Note that the "support leg" is the leg that in contact with the ground and supports the body weight during the walking period. On the other hand, the "swing leg" is, typically, the leg that is off the ground and on which weight is not placed during the walking period. Alternatively, the "swing leg" is the leg that lightly supports the body weight compared to the support leg and advances in the direction of travel during the walking period.

In the body weight unloading apparatus according to the above aspect, determining the magnitude of the second unloading force according to the first ratio may include increasing the second unloading force as the first ratio increases, and reducing the second unloading force as the first ratio decreases. Also, determining the magnitude of the first unloading force according to the second ratio may include increasing the first unloading force as the second ratio increases, and reducing the first unloading force as the second ratio decreases.

It is often the case that the action of lifting the legs during the walking motion is difficult for individuals with gait impairments. According to this configuration, the magnitude of the unloading force on each leg can be controlled such that the unloading force on the leg decreases when the leg is the support leg, and the unloading force on the leg increases when the leg is the swing leg. The unloading force can thereby be generated so as to comparatively strongly support the action of lifting the legs during the walking motion.

In the body weight unloading apparatus according to the above aspect, determining the magnitude of the second unloading force according to the first ratio may be constituted by computing a first product of the first ratio and a first proportional constant, computing a first sum of the computed first product and a first constant term, and employing the computed first sum as a value of the second unloading force. Also, determining the magnitude of the first unloading force according to the second ratio may be constituted by computing a second product of the second ratio and a second proportional constant, computing a second sum of the computed second product and a second constant term, and employing the computed second sum as a value of the first unloading force. According to this configuration, the magnitude of the unloading force acting on each leg can be easily adjusted using respective proportional constants and constant terms, thereby enabling a training program to be created according to various states of the user.

In the body weight unloading apparatus according to the above aspect, the control device may be further configured to receive designation of respective values of the first constant term and the second constant term. According to this configuration, the magnitude of the unloading force on each leg can be easily adjusted, by changing the value of respective constant terms.

In the body weight unloading apparatus according to the above aspect, determining the respective magnitudes of the first unloading force and the second unloading force may include maintaining a total of the first unloading force and the second unloading force at a constant predetermined value. Also, in a case where a total of the respective designated values of the first constant term and the second constant term is greater than or equal to the predetermined value, the control device may determine the respective magnitudes of the first unloading force and the second unloading force according to a ratio of the respective designated values of the first constant term and the second constant term. According to this configuration, even if the total of the constant terms (bias) of the unloading forces is set to exceed a predetermined value, it can be ensured that the total of the unloading forces that are supplied to the legs does not exceed a constant predetermined value. It is thereby possible to prevent an unloading force exceeding a desired magnitude from acting on the user. Also, by determining the respective magnitudes of the unloading forces according to the ratio of the respective values of the constant terms, unloading forces that correspond to the intent of the settings of the constant terms can be applied to the legs of the user.

In the body weight unloading apparatus, according to the above aspect, the sensor may be constituted by a first sensor configured to measure a first floor reaction force acting on a sole of a foot of the one leg of the user and a second sensor configured to measure a second floor reaction force acting on a sole of a foot of the other leg of the user. Acquiring information indicating the imbalance between the floor reaction forces may include acquiring values of the first floor reaction force and the second floor reaction force respectively measured by the first sensor and the second sensor. The first ratio may be a ratio of a value of the first floor reaction force to a total value of the first floor reaction force and the second floor reaction force. The second ratio may be a ratio of a value of the second floor reaction force to a total value of the first floor reaction force and the second floor reaction force. Comparatively inexpensive sensors such as load cells can be utilized for the first sensor and the second sensor. Thus, according to the above configuration, a body weight unloading apparatus that can be manufactured comparatively inexpensively can be provided.

In the body weight unloading apparatus, according to the above aspect, the first sensor and the second sensor may each include a first force sensor disposed on a heel side of the sole of the foot and a second force sensor disposed on a toe side of the sole of the foot. The entire surface of the sole of the foot of each leg does not necessarily contact the ground during the walking period. There can also be periods in which only the toe portion of the sole of the foot is in contact, and periods in which only the heel portion of the sole of the foot is in contact. According to this configuration, the floor reaction force acting on the sole of the foot of each leg during the walking period can be accurately measured, by disposing the first force sensor on the heel portion and disposing the second force sensor on the toe portion. The imbalance between the floor reaction forces that have been accurately measured can thereby be reflected in the determination of the unloading force on each leg.

In the body weight unloading apparatus, according to the above aspect, the sensor may be configured to measure a central position of the floor reaction force acting on each of the legs of the user as information indicating the imbalance between the floor reaction forces. Acquiring information indicating the imbalance between the floor reaction forces may include acquiring a value of the measured central position of the floor reaction force. The first ratio may be a ratio of the value of the central position of the floor reaction force to a value of the position of the one leg when based on the position of the other leg. The second ratio may be a ratio of the value of the central position of the floor reaction force to a value of the position of the other leg when based on the position of the one leg. According to this configuration, a sensor need not be disposed on the soles of the feet of the legs, thereby encouraging the user to move naturally. In particular, the constituent element that is disposed under the soles of the feet is flexible, enabling the user to take natural steps.

In the body weight unloading apparatus, according to the above aspect, the control device may be further configured to adjust timings for generating the first unloading force and the second unloading force at the respectively determined magnitudes, according to a gait cycle. According to this configuration, the unloading force that is applied to each leg can be temporally adjusted. Due to this adjustment, the effect of allowing the user to engage in training for restoring a natural gait that is bilaterally symmetrical can be further expected.

In the body weight unloading apparatus, according to the above aspect, the control device may be further configured to increase at least one of the first unloading force and the second unloading force by a sensory threshold at a predetermined timing of the gait cycle. According to this configuration, the user can be taught the walking motion timing through somatic sensation.

In the body weight unloading apparatus, according to the above aspect, the first actuator and the second actuator may each be constituted by a pneumatic artificial muscle. A pneumatic artificial muscle is an example of an actuator that obtains motive power by injecting air into an elastic material such as rubber or carbon fiber, and is comparatively inexpensive. Thus, according to the above configuration, a body weight unloading apparatus that can be manufactured inexpensively can be provided.

In the body weight unloading apparatus, according to the above aspect, the artificial muscle of each of the actuators may be initially set by applying compressed air at a predetermined pressure, in a state where the proximal ends of the support members are fitted to the user, and causing the support members to be tensioned such that a muscle contraction rate attains a predetermined value. The driving force of the pneumatic artificial muscle is determined by the pressure of air (hereinafter, also referred to simply as "air pressure") applied to the artificial muscle and the muscle contraction rate of the artificial muscle. The change in driving force due to variation in the muscle contraction rate decreases when the applied air pressure is low, and the change in driving force due to variation in the muscle contraction rate increases when the applied air pressure is high. Similarly, the change in driving force due to variation in the air pressure decreases in a state where the muscle contraction rate is high, and the change in driving force due to variation in the air pressure increases in a state where the muscle contraction rate is low. Thus, the air pressures and the muscle contraction rates being properly set is desirable in controlling the driving force. According to this configuration, the state of the artificial muscle of each actuator can be initialized to be suitable for controlling of the unloading force. The unloading force that is generated for each leg can thereby be easily controlled.

The body weight unloading apparatus, according to the above aspect, body weight unloading apparatus according to the above aspect may further include a suspender suspending the first support member and the second support member such that the proximal ends of the first support member and the second support member hang down from upward of the user. The first support member and the second support member may each include a cable having a proximal end and a distal end, and suspended by the suspender, a coupler formed to have a dog-legged shape, and having a first end part, a second end part and a raised part disposed between the two end parts and oriented upward, a first rope coupling the raised part of the coupler and the proximal end of the cable, and configured to be adjustable in length, a second rope having a proximal end and a distal end, whereby the distal end is joined to the first end part of the coupler, and a third rope having a proximal end and a distal end, whereby the distal end is joined to the second end part of the coupler. The distal end of the cable of each of the support members may constitute the distal end of the support member. The respective proximal ends of the second rope and the third rope of each of the support members may constitute the proximal end of the support member. According to this configuration, a body weight unloading apparatus in which the length of each support member can appropriately adjusted for the size of the user's body can be provided.

In the body weight unloading apparatus, according to the above aspect, the suspender may include a pair of column parts. Also, the body weight unloading apparatus may further include a pair of restraints configured to retrain movement of the couplers of the support members, by respectively coupling the couplers to the column parts. According to this configuration, movement of the couplers can be suppressed during the walking motion of the user.

Advantageous Effects of Invention

According to the present invention, a body weight unloading apparatus capable of independently and dynamically changing the unloading forces on the user's left and right legs during the walking period can be provided.

DESCRIPTION OF EMBODIMENTS

Hereinafter, an embodiment (hereinafter, referred to also as "the present embodiment") according to one aspect of the present invention will be described based on the drawings. The present embodiment described below is, however, merely an example of the present invention in all respects. Various improvements or modifications may be made without departing from the scope of the invention. In other words, specific configurations that depend on the embodiment may be employed as appropriate in implementing the present invention. Note that, for convenience of description, the following description will be given based on the orientation within the drawings.

1. Configuration Example

Figure 1:
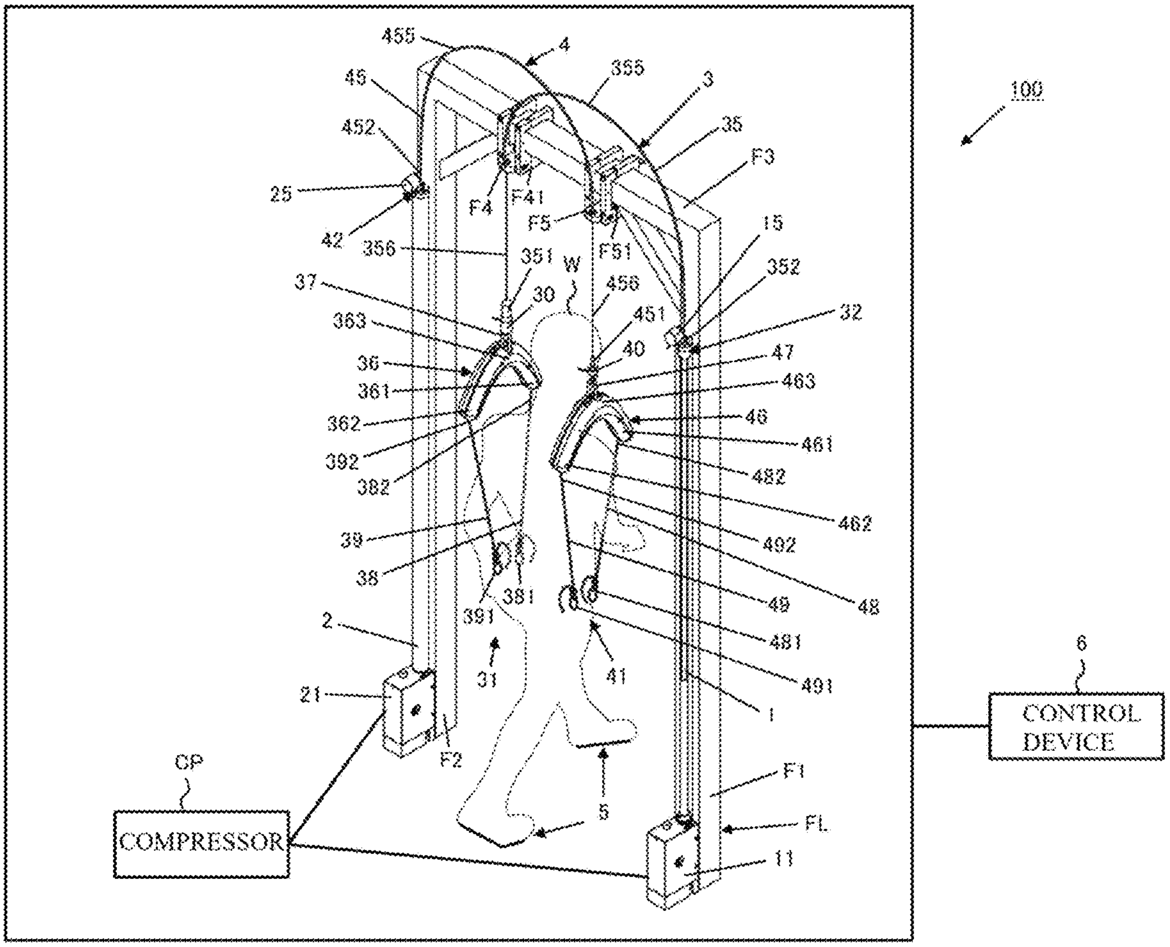
FIG. 1 schematically illustrates an example of a body weight unloading apparatus according to an embodiment.

First, the configuration of a body weight unloading apparatus 100 (body weight load reduction device) according to the present embodiment will be described using FIG. 1. FIG. 1 schematically illustrates an example of the body weight unloading apparatus 100 according to the present embodiment.

The body weight unloading apparatus 100 according to the present embodiment is utilized in order to at least a partially unload the body weight of the user W. The purpose of unloading the body weight of the user W (i.e., intended purpose of body weight unloading apparatus 100) need not be particularly limited, and may be determined as appropriate according to the embodiment. For example, the body weight unloading apparatus 100 may be used in walking movement training for individuals with gait impairments such as hemiplegic patients and elderly people who have difficulty walking on their own. Note that user W may be replaced as appropriate by subject, wearer or trainee, for example, according to the situation.

The body weight unloading apparatus 100 according to the present embodiment includes a first actuator 1, a second actuator 2, a first support member 3, a second support member 4, a sensor 5, a control device 6, and a suspender FL. The actuators (1, 2) respectively supply unloading forces to the legs of the user W. The support members (3, 4) respectively transmit the unloading forces that are supplied by the actuators (1, 2) to the legs of the user W. The sensor 5 measures information indicating the imbalance between the floor reaction forces respectively acting on the legs of the user W. The control device 6 determines the magnitude of the unloading force on each leg, based on the information indicating the imbalance between the floor reaction forces measured by the sensor 5, and controls the operations of each actuator (1, 2). The suspender FL suspends each support member (3, 4) such that one end (proximal end (31, 41) described later) of each support member (3, 4) hangs down from upward of the user W. The body weight unloading apparatus 100 is thereby able to at least partially lift the body weight of the user W vertically, by respectively applying the unloading forces whose magnitudes were determined according to the imbalance between the floor reaction forces to the legs of the user W.

Note that, in the example in FIG. 1, the first actuator 1 and the first support member 3 are used in order to apply an unloading force to the leg on the left side (hereinafter, also simply "left leg") of the user W. Also, the second actuator 2 and the second support member 4 are used in order to apply an unloading force to the leg on the right side (hereinafter, also simply "right leg") of the user W. That is, the leg on the left side of the user W is an example of "one leg" of the present invention, and the leg on the right side of the user W is an example of the "the other leg" of the present invention. The relationship between each constituent element and the body direction of the user W need not, however, be limited to such an example. The relationship may be opposite to the present embodiment. That is, the first actuator 1 and the first support member 3 may be used in order to apply an unloading force to the right leg of the user W, and the second actuator 2 and the second support member 4 may be used in order to apply an unloading force to the left leg of the user W. "One" need only correspond to one of the left and right, and "the other" need only correspond to the other of the left and right. Similarly, "first" need only correspond to one of the left and right, and "second" need only correspond to the other of the left and right. Also, the "leg" is the portion from the foot to the hip and, and may also be referred to as the "lower limb". The "foot" is the portion from the ankle down (to the sole of the foot) and is the portion of the leg that contacts the ground. The "sole of the foot" is the surface of the foot that contacts the ground. Hereinafter, the constituent elements will be described.

Actuators

First, an example of the actuators (1 and 2) will be described. In the present embodiment, the first actuator 1 is constituted by a pneumatic artificial muscle. In order to control the air pressure that operates the artificial muscle, a valve 11 is attached to the first actuator 1. Similarly, the second actuator 2 is constituted by a pneumatic artificial muscle. A valve 21 is attached to the second actuator 2. The type of pneumatic artificial muscle of the actuators (1, 2) need not be particularly limited, and may be selected as appropriate according to the embodiment. An actuator device that is proposed in JP 2016-61302A, for example, may be used for the actuators (1, 2).

The valves (11, 21) are connected to a common compressor CP. A common primary pressure is thereby supplied to the valves (11, 21) from the compressor CP. The valves (11, 21) output a pressure adjusted from the primary pressure to each actuator (1, 2), under the control of the control device 6. Known pressure control valves may be used for the valves (11, 21).

A pneumatic artificial muscle is an example of an actuator that obtains motive power by injecting air into an elastic material such as rubber or carbon fiber, and is comparatively inexpensive. Thus, in the present embodiment, by using pneumatic artificial muscles for the actuators (1, 2), the manufacturing cost of the body weight unloading apparatus 100 can be kept down.

Note that, in the example in FIG. 1, the periphery of the second actuator 2 (artificial muscle) is covered by a cover, whereas the first actuator 1 (artificial muscle) is exposed rather than being covered. The provision of this cover need not be particularly limited, and may be selected as appropriate according to the embodiment. The cover of the second actuator 2 may be omitted. Also, the periphery of the first actuator 1 may be covered by a cover.

Suspender and Support Members

Next, an example of the suspender FL and the support members (3, 4) will be described. The first support member 3 has a proximal end 31 and a distal end 32. The proximal end 31 is the end closer to the user W, and the distal end 32 is a different end from the proximal end 31 and is the end further away from the user W. This similarly applies to the near and distal ends of other constituent elements. The distal end 32 is connected to the first actuator 1. The "connection" may be direct or indirect. This similarly applies to the "connection" of other constituent elements. In the present embodiment, a linear encoder 15 is attached to the connecting portion between the distal end 32 of the first support member 3 and the first actuator 1. This linear encoder 15 measures the muscle contraction rate of the pneumatic artificial muscle constituting the first actuator 1. On the other hand, the proximal end 31 is fitted to the user W such that the first unloading force that is supplied by the first actuator 1 acts on the leg on the left side of the user W.

Similarly, the second support member 4 has a proximal end 41 and a distal end 42. The distal end 42 is connected to the second actuator 2. In the present embodiment, a linear encoder 25 is attached to the connecting portion between the distal end 42 of the second support member 4 and the second actuator 2. The linear encoder 25 measures the muscle contraction rate of the pneumatic artificial muscle constituting the second actuator 2. On the other hand, the proximal end 41 is fitted to the user W such that the second unloading force that is supplied by the second actuator 2 acts on the leg on the right side of the user W.

The suspender FL suspends the support members (3, 4) such that the proximal ends (31, 41) of the support members (3, 4) hang down from upward of the user W. In the present embodiment, the suspender FL is provided with a pair of column parts (F1, F2), a beam part F3, and a pair of holding parts (F4, F5). The column parts (F1, F2) are configured to extend vertically and are respectively disposed on the right and left of the user W. For example, in the case where the user W practices walking movement on a treadmill (not shown), the column parts (F1, F2) may be respectively fixed on the right and left of the treadmill. Alternatively, a moving component such as a caster may be attached to a lower end of each column part (F1, F2), such that the suspender FL can track the movement of the user W.

The beam part F3 is configured to bridge between the upper ends of the column parts (F1, F2) and extend horizontally. The pair of holding parts (F4, F5) disposed to be horizontally separated from each other are provided on the beam part F3. Since the unloading force is to be applied on the inner side with respect to the shoulder of the user W, the distance between the pair of holding parts (F4, F5) is preferably set slightly narrower than the shoulder width of the user W. The holding units (F4, F5) are configured to respectively hold the support members (3, 4). This configuration will be described in detail later. Also, the holding units (F4, F5), by respectively being provided with clamp parts (F41, F51), are constituted such that the position at which the holding units (F4, F5) are fixed on the beam part F3 is adjustable. The distance between the pair of holding parts (F4, F5) can thereby be adjusted. The material of the constituent elements of the suspender FL need not, however, be particularly limited, and may be selected as appropriate according to the embodiment.

Next, an example of the configuration of the support members (3, 4) will be described in detail. In the present embodiment, the first support member 3 is provided with a cable 35, a coupler 36, a first rope 37, a second rope 38, and a third rope 39. The cable 35 is constituted by an outer cable 355 and an inner cable 356. The cable 35 has a proximal end 351 and a distal end 352. The distal end 352 of the cable 35 constitutes the distal end 32 of the first support member 3. That is, the distal end 352 of the cable 35 is connected to the first actuator 1. In the present embodiment, the first actuator 1 and the valve 11 are attached to the right column part F1 as seen from the user W. The cable 35 extends from the first actuator 1 and is held by the holding part F4 which is disposed on the left half side of the body of the user W, and is thereby suspended on the left half side of the body of the user W by the suspender FL. Due to the cable 35 passing through the holding unit F4 disposed on the left side from the first actuator 1 disposed on the right side, the distance for stringing the cable 35 across is secured, and it can be ensured that the transmissibility of the first unloading force in the cable 35 is not impaired.

The coupler 36 is formed to have a dog-legged shape like a boomerang. The coupler 36 has a first end part 361, a second end part 362, and a raised part 363. In the example in FIG. 1, the first end part 361 is oriented forward of the user W during use of the body weight unloading apparatus 100. The second end part 362 is oriented rearward of the user W during use. The direction in which the ends (361, 362) face need not, however, be limited to such an example, and may be selected as appropriate according to the embodiment. The raised part 363 is disposed between both end parts (361, 362) and is oriented upward.

The first rope 37 couples the raised part 363 of the coupler 36 and the proximal end 351 of the cable 35. A load cell 30 is attached to a joining portion of the first rope 37 and the proximal end 351 of the cable 35. The load cell 30 measures the first unloading force supplied by the first actuator 1 and acting on the leg on the left side of the user W. The first rope 37 is configured to be adjustable in length.

The second rope 38 has a proximal end 381 and a distal end 382. The distal end 382 is joined to the first end part 361 of the coupler 36. Similarly, the third rope 39 has a proximal end 391 and a distal end 392. The distal end 392 is joined to the second end part 362 of the coupler 36. The respective proximal ends (381, 391) of the second rope 38 and the third rope 39 constitute the proximal end 31 of the first support member 3. That is, the respective proximal ends (381, 391) of the ropes (38, 39) are fitted to the user W.

The second support member 4 is constituted similarly to the first support member 3. That is, the second support member 4 includes a cable 45, a coupler 46, a first rope 47, a second rope 48, and a third rope 49. The cable 45 is constituted by an outer cable 455 and an inner cable 456. The cable 45 has a proximal end 451 and a distal end 452. The distal end 452 of the cable 45 constitutes the distal end 42 of the second support member 4 and is connected to the second actuator 2. In the present embodiment, the second actuator 2 and the valve 21 are attached to the left column part F2 as seen from the user W. The cable 45 extends from this second actuator 2 and is held by the holding part F5 which is disposed on the right half side of the body of the user W, and is thereby suspended on the right half side of the body of the user W by the suspender FL. Due to the cable 45 passing through the holding unit F5 disposed on the right side from the second actuator 2 arranged on the left side, the distance for stringing the cable 45 across is secured, and it can be ensured that transmissibility of the second unloading force in the cable 45 is not impaired. That is, in the present embodiment, due to the cable 35 of the first support member 3 extending toward the holding part F4 on the left side from the first actuator 1 attached to the column part F1 on the right side, and the cable 45 of the second support member 4 extending toward the holding part F5 on the right side from the second actuator 2 attached to the column part F2 on the left side, the cables (35, 45) intersect slightly upward of the beam part F3. A distance extending in the width direction of the cables (35, 45) can thereby be secured, and, as a result, the cables (35, 45) can be made to curve more gently upward of the beam part F3. Due to this action, loss of the unloading forces in the cables (35, 45) can be reduced. Furthermore, the height of the upward curving portion of the cables (35, 45) from the beam part F3 can be lowered. In the case where the body weight unloading apparatus 100 is used indoors, it can thereby be ensured that the curved portion of each cable (35, 45) does not physically interfere with the ceiling or ceiling installations, even when the position of the beam part F3 is increased in height in order to secure space for the user W.

The coupler 46 is formed to have a dog-legged shape like a boomerang. The coupler 46 includes a first end part 461, a second end part 462, and a raised part 463. In the example in FIG. 1, the first end part 461 is oriented forward of the user W, and the second end part 462 is oriented backward of the user W. The direction in which the ends (461, 462) face need not, however, be limited to such an example, and may be selected as appropriate according to the embodiment. The raised part 463 is disposed between the ends (461, 462) and is oriented upward.

The first rope 47 connects the raised part 463 of the coupler 46 and the proximal end 451 of the cable 45. A load cell 40 is attached to the joining portion of the first rope 47 and the proximal end 451 of the cable 45. The load cell 40 measures the second unloading force supplied by the second actuator 2 and acting on the leg on the right side of the user W. The first rope 47 is constituted to be adjustable in length.

Note that, in the example in FIG. 1, the joining portion of the first rope 37 and the proximal end 351 of the cable 35, including the load cell 30, is covered by a cover, whereas the joining portion of the first rope 47 and the proximal end 451 of the cable 45, including the load cell 40, is exposed rather than being covered. The provision of this cover need not be particularly limited, and may be selected as appropriate according to the embodiment. The cover of the joining portion in the first support member 3 may be omitted. Also, the joining portion in the second support member 4 may be covered by a cover.

The second rope 48 has a proximal end 481 and a distal end 482. The distal end 482 is joined to the first end part 461 of the coupler 46. Similarly, the third rope 49 has a proximal end 491 and a distal end 492. The distal end 492 is joined to the second end part 462 of the coupler 46. The proximal ends (481, 491) of the second rope 48 and the third rope 49 constitute the proximal end 41 of the second support member 4. That is, the proximal ends (481, 491) of the ropes (48, 49) are fitted to the user W.

Figure 2A:
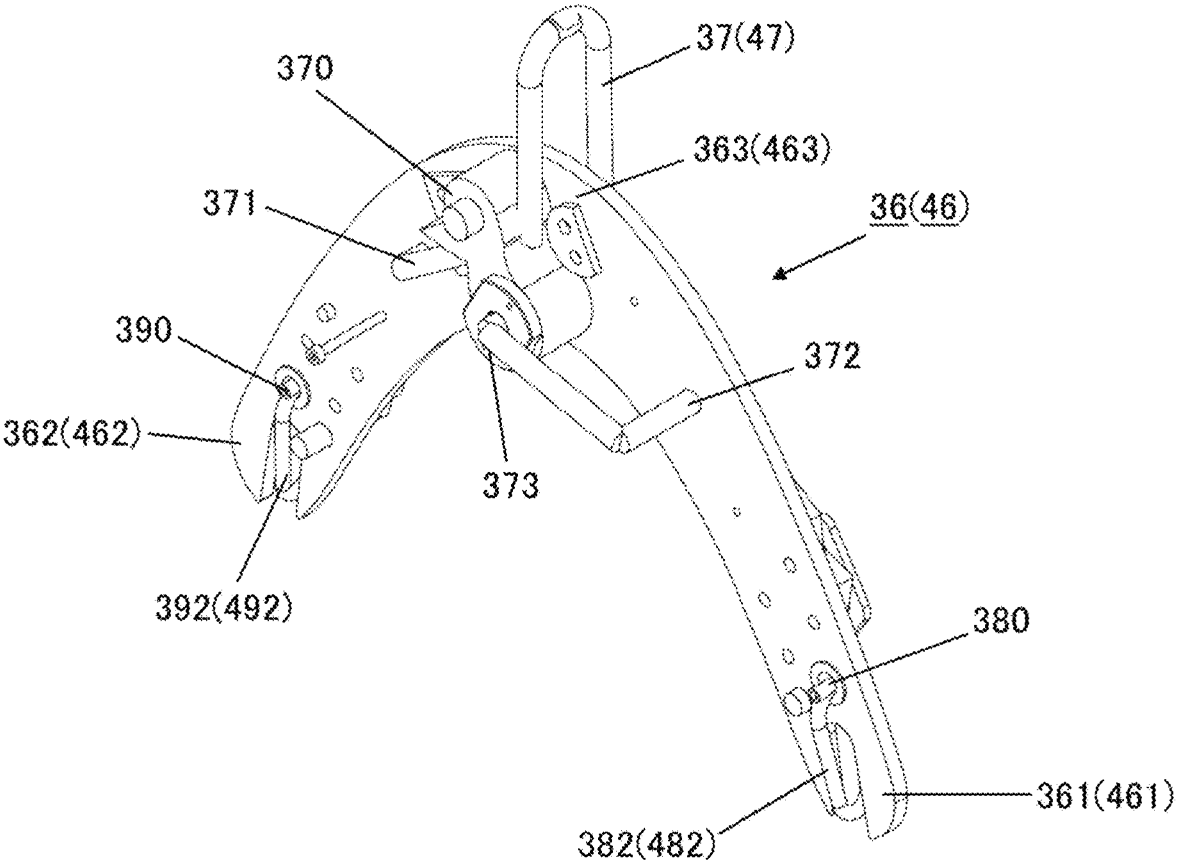
FIG. 2A is a perspective view schematically illustrating an example of a coupler according to the embodiment.
Figure 2B:
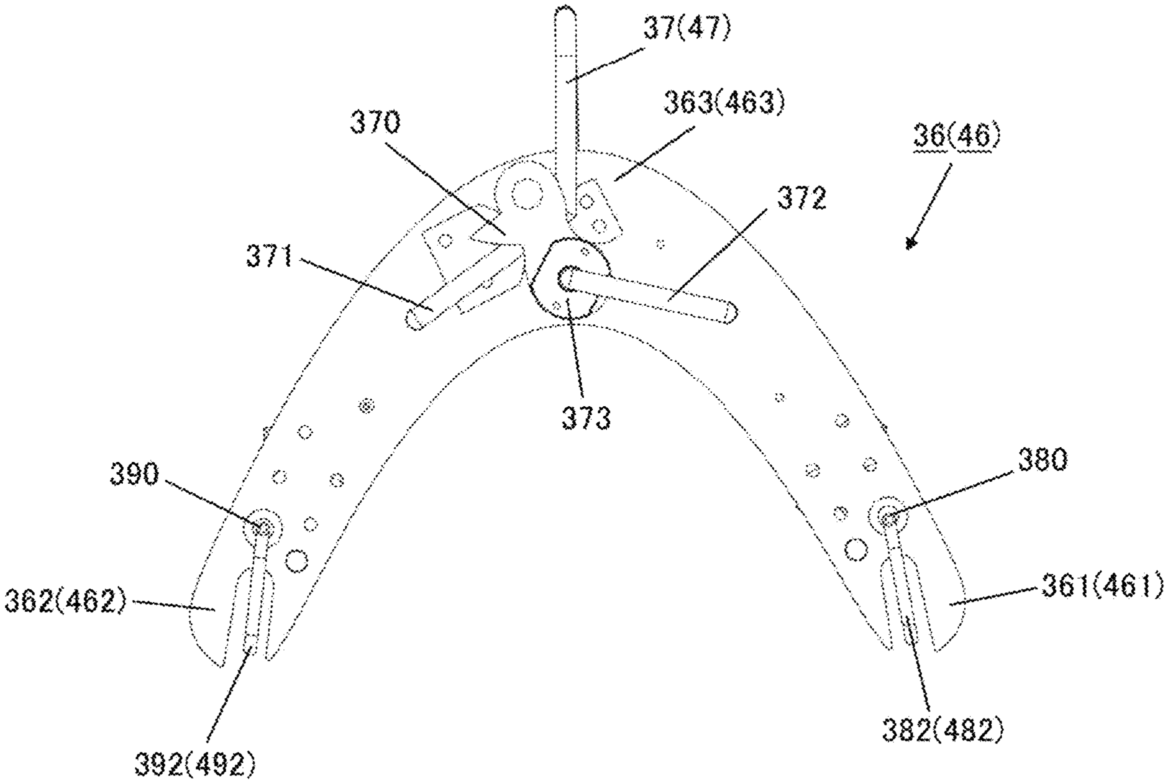
FIG. 2B is a side view schematically illustrating an example of a coupler according to the embodiment.

Here, the peripheral configuration of the couplers (36, 46) of the support members (3, 4) will be described, further using FIGS. 2A and 2B. FIGS. 2A and 2B are perspective and side views schematically illustrating an example of the couplers (36, 46). In the present embodiment, a rope ascender 370 is provided on the raised part 363 of the coupler 36 of the first support member 3. One end 371 of the first rope 37 is drawn out from the rope ascender 370. On the other hand, the other end of the first rope 37 is fixed at the raised part 363 by a fastener 373. The first rope 37 thereby forms an annular portion, and the raised part 363 of the coupler 36 and the proximal end 351 of the cable 35 are coupled by this annular portion. Also, the length of the annular portion of the first rope 37 can be adjusted, by operating the rope ascender 370 to change the drawn out length of the one end 371. The first rope 37 is thereby configured such that the length coupling the raised part 363 of the coupler 36 and the proximal end 351 of the cable 35 is adjustable. Adjusting this coupling length enables the coupler 36 to be disposed at a height suitable for the height of the user W.

The distal end 382 of the second rope 38 is fixed at the first end part 361 by a fastener 380. The distal end 392 of the third rope 39 is fixed at the second end part 362 by a fastener 390. Known fasteners may be used for the fasteners (373, 380, 390). The end parts (361, 362) have a notch formed therein for respectively catching the ropes (38, 39) on. The ropes (38, 39) can thereby be kept from swinging against the coupler 36.

On the other hand, the proximal ends (381, 391) of the ropes (38, 39) are fitted to the user W. The configuration for fitting the proximal ends (381, 391) to the user W need not be particularly limited, and may be determined as appropriate according to the embodiment. For example, the proximal ends (381, 391) may each be provided with a rope ratchet. In correspondence with this, a holder for attaching the rope ratchets may be provided in the vicinity of the waist on the left half of the pants that the user W is wearing. The lengths of the second rope 38 and the third rope 39 can thereby be adjusted so as to be suitable for the length of the torso of the user W, and the proximal end 31 of the first support member 3 can be attached to and detached from the user W with a one touch operation.

The coupler 46 of the second support member 4 is configured similarly to the coupler 36 of the first support member 3. That is, the first rope 47 of the second support member 4 is configured such that length coupling the raised part 463 of the coupler 46 and the proximal end 451 of the cable 45 is adjustable by a rope ascender. Adjusting this coupling length enables the coupler 46 to be disposed at a height suitable for the height of the user W. Also, the distal ends (482, 492) of the ropes (48, 49) are respectively fixed at the ends (461, 462) of the coupler 46 by a fastener. The ends (461, 462) have a notch formed therein for catching the ropes (48, 49) on, and the ropes (48, 49) are thereby kept from swinging against the coupler 46. On the other hand, the proximal ends (481, 491) of the ropes (48, 49) are fitted to the user W. The configuration for fitting the proximal ends (481, 491) to the user W need not be particularly limited, and may be determined as appropriate according to the embodiment, similarly to the first support member 3. For example, the proximal ends (481, 491) may each be provided with a rope ratchet. In correspondence with this, a holder for attaching the rope ratchets may be provided in the vicinity of the waist on the right half of the pants that the user W is wearing. The lengths of the second rope 48 and the third rope 49 can thereby be adjusted so as to be suitable for the length of the torso of the user W, and the proximal end 41 of the second support member 4 can be attached to and detached from the user W with a one touch operation.

The material of the constituent elements of the support members (3, 4) need not be particularly limited, and may be selected as appropriate according to the embodiment. For example, Bowden cables may be used for the cables (35, 45). Climbing ropes may be used for the ropes (36-39, 46-49). Resin material such as fiber-reinforced plastics and engineering plastics may be used for the couplers (36, 46). As shown in FIG. 1, the couplers (36, 46) may be covered such that the internal structure is not exposed.

Figure 2C:
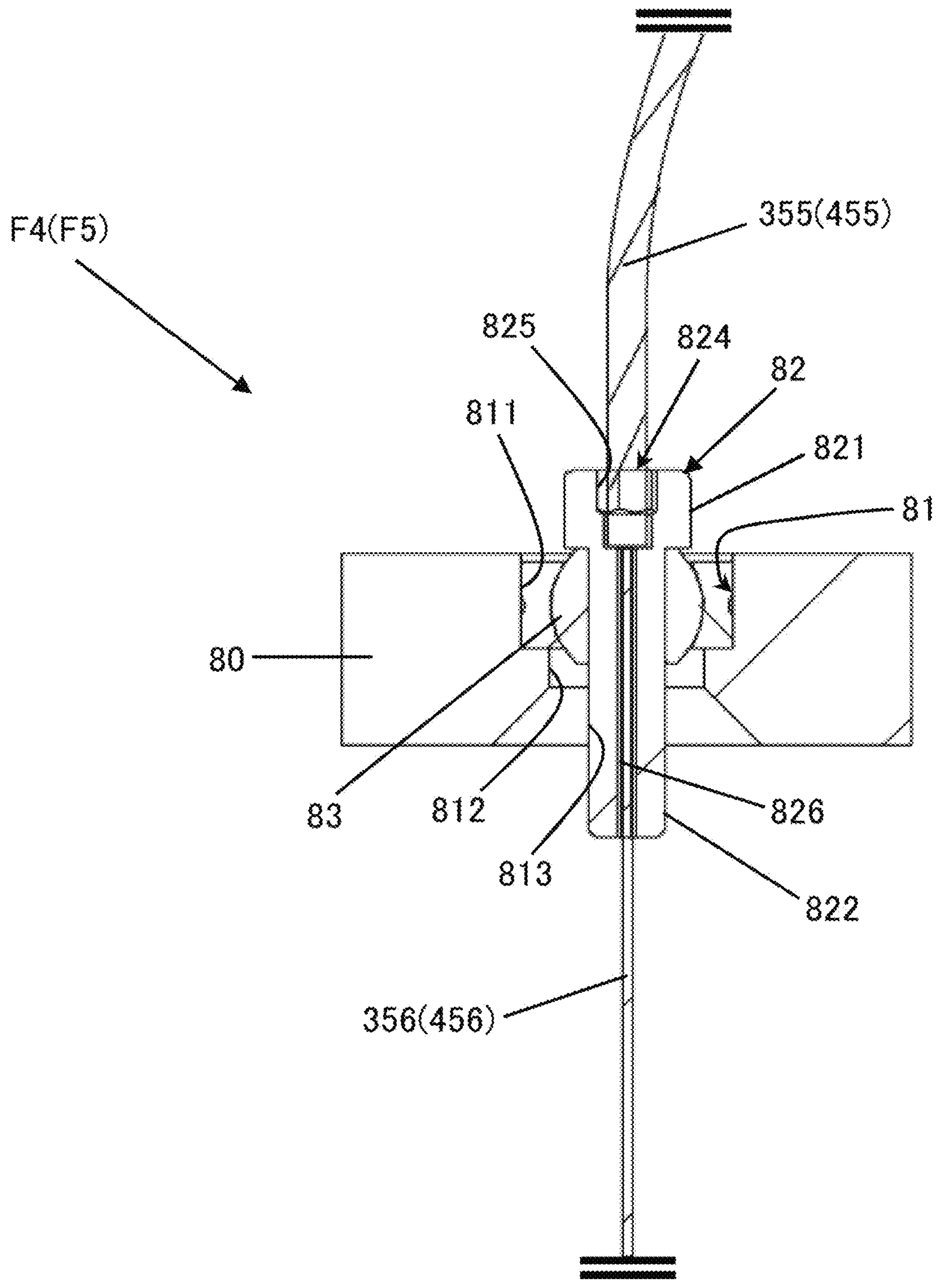
FIG. 2C is a cross-sectional view schematically illustrating an example of a support member being held by a holding part according to the embodiment.

Here, an example of the configurations of the cables (35, 45) and the holding parts (F4 and F5) will be described, further using FIG. 2C. FIG. 2C is a cross-sectional view schematically illustrating an example of the cables (35, 45) being held by the holding parts (F4, F5) according to the present embodiment. In the present embodiment, the cables (35, 45) are respectively provided with the outer cables (355, 455) and the inner cables (356, 456).

The holding parts (F4, F5) are provided with a flat plate part 80 having a through hole 81 that passes through vertically. The through hole 81 is provided with a first portion 811, a second portion 812 and a third portion 813 in order from the top down vertically. The diameter of the first portion 811 is the largest, and the diameter of the third portion 813 is the smallest. A bolt 82 supported by a pillow ball 83 is inserted into this through hole 81.

Specifically, the bolt 82 has a shape extending in one direction (axial direction), and is provided with a head 821 and a shaft 822 that are disposed along the one direction. The diameter of the head 821 is larger than the diameter of the shaft 822, and the pillow ball 83 is stopped by the head 821 and supports the shaft 822. The pillow ball 83 is disposed in the first portion 811 and the second portion 812 of the through hole 81, and the shaft 822 of the bolt 82 extends to the outer side via the third portion 813 of the through hole 81. The bolt 82 is thereby inserted into the through hole 81 via the pillow ball 83.

Also, the bolt 82 is provided, in a planar center, with a through hole 824 that passes through the head 821 and the shaft 822 along the one direction. The cables (35, 45) are respectively held by the holding parts (F4, F5), due to being inserted into this through hole 824 of the bolt 82. Specifically, the through hole 824 is provided with a first portion 825 and a second portion 826 in order from the head 821 side. The diameter of the first portion 825 is larger than the diameter of the second portion 826.

In the present embodiment, the end of the outer cable (355, 455) of the cables (35, 45) is inserted into the first portion 825. In other words, the outer cable (355, 455) extends from the actuators (1, 2) to the bolt 82 of the holding parts (F4, F5). On the other hand, the length of the inner cable (356, 456) of the cables (35, 45) is longer than the outer cable (355, 455). The inner cable (356, 456) of the cables (35, 45) thereby extends to the outer side via the second portion 826 of the through hole 824.

The distal ends of the inner cables (356, 456) are respectively coupled to the actuators (1, 2), and the proximal ends are respectively coupled to the first ropes (37, 47). The unloading forces that are supplied by the actuators (1, 2) are respectively transmitted to the first ropes (37, 47) via the inner cables (356, 456).

The holding units (F4, F5) are able to achieve operation and effects such as the following, by respectively holding the cables (35, 45) with the above configuration. That is, when the cables (35, 45) move back and forth and side to side and incline from the vertical while the user W is walking, the pillow balls 83 rotate and slide in the feeding direction of the cables (35, 45), thus enabling friction of the cables (35, 45) in the holding parts (F4, F5) to be inhibited from occurring. Loss of the unloading forces that are transmitted from the actuators (1, 2) can thereby be suppressed. Also, the cables (35, 45) can be prevented from being cut due to friction.

Note that the configuration for holding the cables (35, 45) in the holding parts (F4, F5) via the pillow balls 83 need not be limited to the above example, and may be determined as appropriate according to the embodiment. Degrees of freedom may be provided in the feeding direction of the cables (35, 45), by the holding units (F4, F5) being provided with bearings such as pillow balls, and the cables (35, 45) being held via the bearings. The degrees of freedom in the feeding direction of the cables (35, 45) are realized by the action of bearings such as rotating and sliding. Similarly to the above, friction of the cables (35, 45) in the holding parts (F4, F5) can thereby be inhibited from occurring.

Note that the structure of the holding parts (F4, F5) may also be incorporated in a coupling part of the distal end of the outer cables (355, 455) of the support members (3, 4) and the actuators (1, 2). Attachment error of the drive shaft of the actuators (1, 2) and the support members (3, 4) can thereby be tolerated.

Sensor

Figure 3:
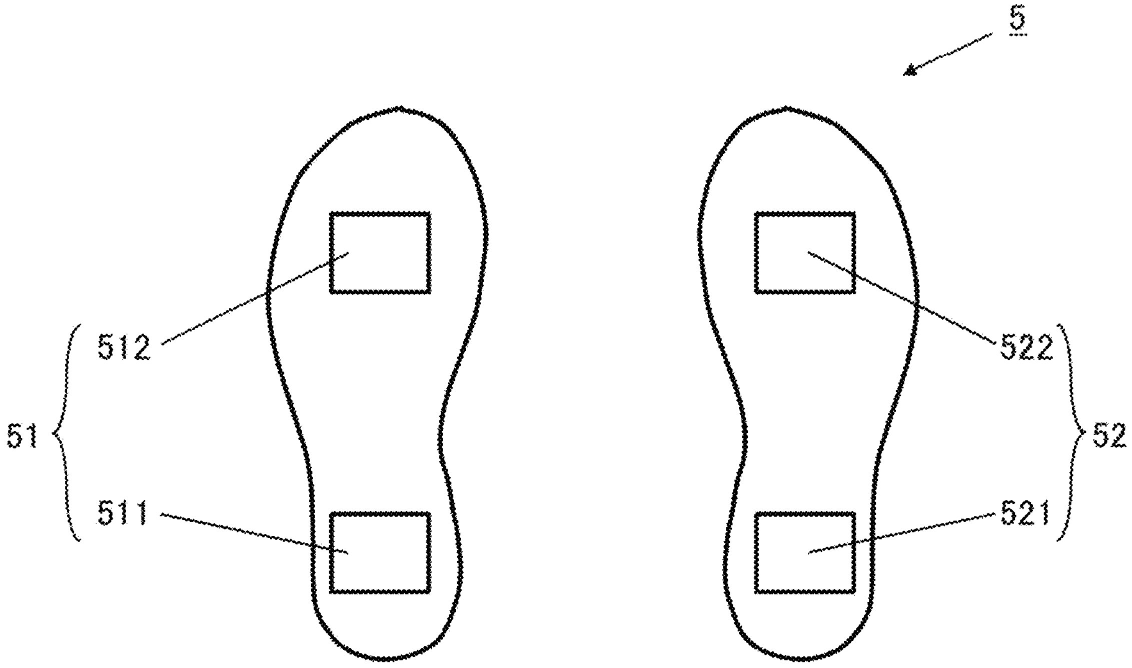
FIG. 3 schematically illustrates an example of a sensor according to the embodiment.

Next, an example of the sensor 5 will be described, further using FIG. 3. FIG. 3 schematically illustrates an example of the sensor 5 according to the present embodiment. The sensor 5 is configured to measure information indicating the imbalance between the floor reaction forces respectively acting on the legs of the user W. In the present embodiment, the sensor 5 is constituted by a first sensor 51 and a second sensor 52.

In the present embodiment, the first sensor 51 includes a first force sensor 511 that is disposed on the heel side (e.g., heel portion) of the sole of the foot and a second force sensor 512 that is disposed on the toe side (e.g., toe portion) of the sole of the foot. The first sensor 51 may be disposed on an insole of the shoe that the user W wears on the foot of left leg, for example. The first sensor 51 according to the present embodiment is thereby configured to measure a first floor reaction force acting on the sole of the foot of the leg on the left side of the user W.

Similarly, the second sensor 52 includes a first force sensor 521 that is disposed on the heel side of the sole of the foot and a second force sensor 522 that is disposed on the toe portion of the sole of the foot. The second sensor 52 may be disposed on an insole of the shoe that the user W wears on the foot of the right leg, for example. The second sensor 52 according to the present embodiment is thereby configured to measure a second floor reaction force acting on the sole of the foot of the leg on the right side of the user W. Load cells, for example, may be used for the force sensors (511, 512, 521, 522).

During the walking period, the entire surface of the soles of the feet of the legs of the user W does not necessarily contact the ground. There can also be periods in which only the toe portion of the sole of the foot is in contact, and periods in which only the heel portion of the sole of the foot is in contact. According to the present embodiment, the floor reaction force acting on the sole of the foot of each leg during the walking period can be accurately measured, by disposing the first force sensors (511, 521) on the heel portion and disposing the second force sensors (512, 522) on the toe portion. The imbalance between the accurately measured floor reaction forces can thereby be reflected in the determination of the unloading force on each leg. Also, as mentioned above, relatively inexpensive sensors such as load cells and force sensing resistors (FSR) can be used for the sensors (51, 52). Thus, the manufacturing cost of the body weight unloading apparatus 100 can be kept down.

Control Device

Figure 4:
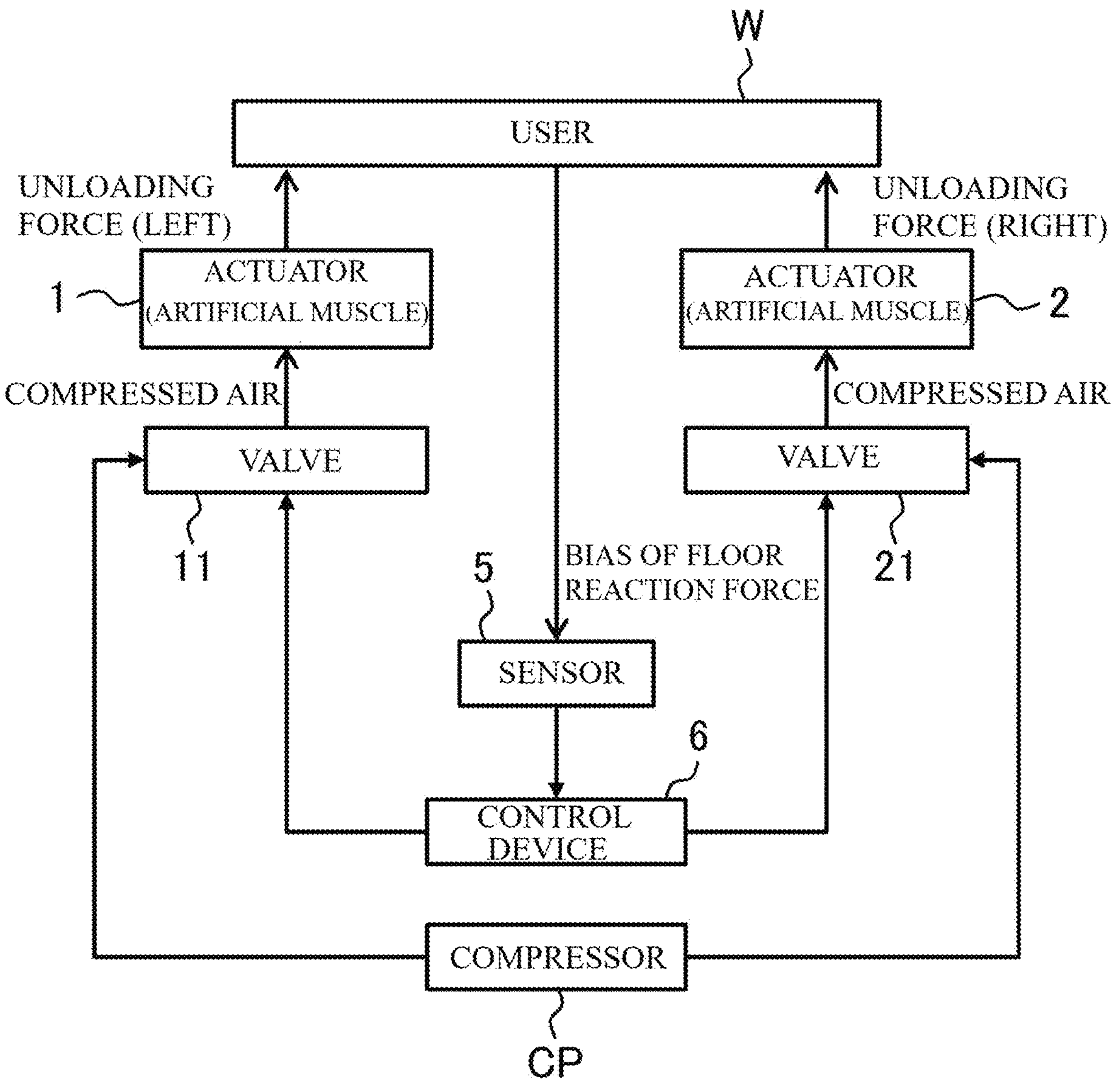
FIG. 4 schematically illustrates an example of a system configuration of the body weight unloading apparatus according to the embodiment.

Next, an example of the control device 6 will be described, further using FIG. 4. FIG. 4 schematically illustrates an example of a system configuration of the body weight unloading apparatus 100 including the control device 6. The control device 6 is a computer configured to control the operations of the actuators (1, 2).

The imbalance between the floor reaction forces respectively acting on the legs of the user W is measured by the sensor 5. The control device 6 acquires information indicating the imbalance between the floor reaction forces measured by the sensor 5. The control device 6 determines the respective magnitudes of the first unloading force and the second unloading force, according to the imbalance between the floor reaction forces indicated by the acquired information. The control device 6 then controls the first actuator 1 and the second actuator 2, so as to generate the first unloading force and the second unloading force at the respectively determined magnitudes.

In the present embodiment, the actuators (1, 2) are constituted by pneumatic artificial muscles. The actuators (1, 2) are fitted with the valves (11, 21), and the valves (11, 21) are connected to the compressor CP. A common primary pressure is supplied to the valves (11, 21) from the compressor CP. The control device 6 controls the output valves of the valves (11, 21) to regulate the pressure of compressed air that is output from the valves (11, 21). The control device 6 thereby controls the operations of the first actuator 1, such that the first unloading force is output at the determined magnitude from the first actuator 1. Also, the control device 6 controls the operations of the second actuator 2, such that the second unloading force is output at the determined magnitude from the second actuator 2. In the present embodiment, the first unloading force output from the first actuator 1 is applied to the leg on the left side of the user W, and the second unloading force output from the second actuator 2 is applied to the leg on the right side of the user W.

Hardware Configuration

Figure 5:
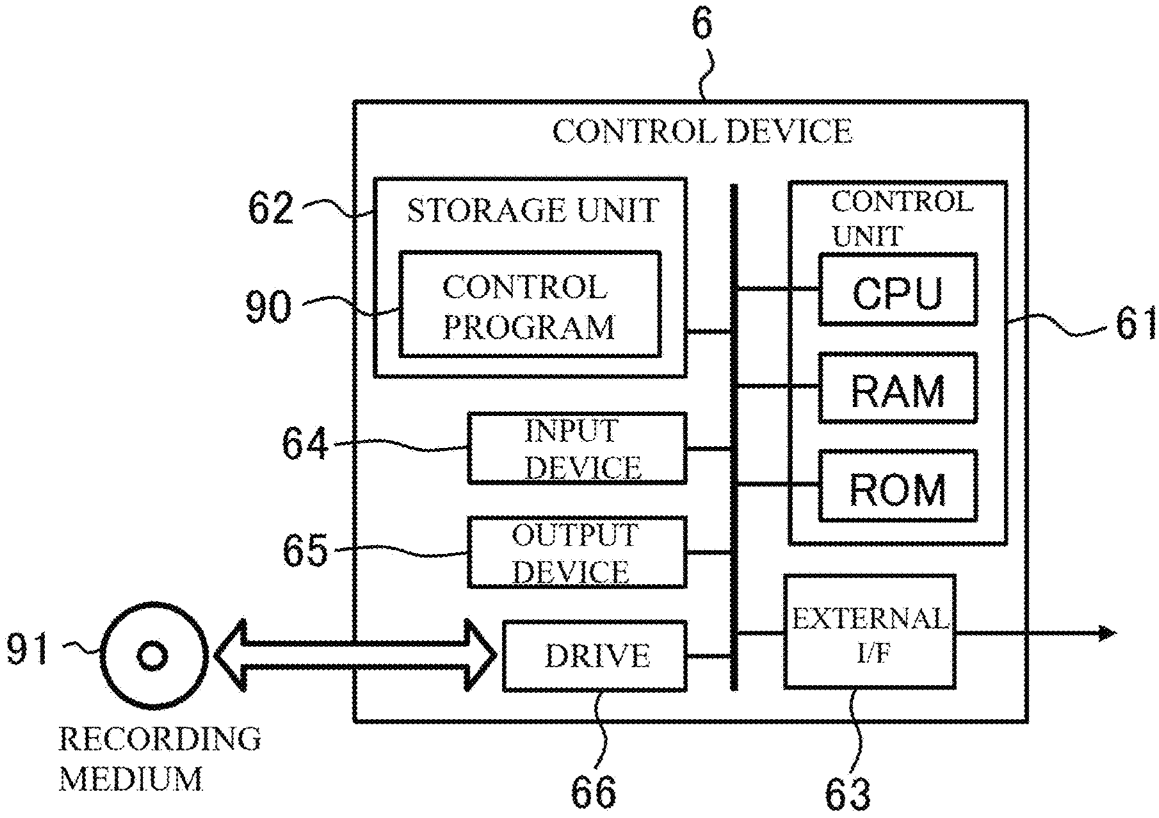
FIG. 5 schematically illustrates an example of the hardware configuration of a control device according to the embodiment.

Next, an example of the hardware configuration of the control device 6 according to the present embodiment will be described using FIG. 5. FIG. 5 schematically illustrates an example of the hardware configuration of the control device 6 according to the present embodiment.

As shown in FIG. 5, the control device 6 according to the present embodiment is a computer in which a control unit 61, a storage unit 62, an external interface 63, an input device 64, an output device 65 and a drive 66 are electrically connected. Note that, in FIG. 5, the external interface is referred to as “external I/F”.

The control unit 61 includes a CPU (Central Processing Unit), which is an example of a processor, a RAM (Random Access Memory), and a ROM (Read Only Memory), and is configured to execute information processing based on programs and various data. The storage unit 62 is an example of memory, and is constituted by a hard disk drive or a solid-state drive, for example. In the present embodiment, the storage unit 62 stores various information such as a control program 90.

The control program 90 is a program for causing the control device 6 to execute information processing (FIG. 9) described later relating to control of the actuators (1, 2). The control program 90 includes a series of commands of the information processing. A detailed description will be given later.

The external interface 63 is a USB (Universal Serial Bus) port or a dedicated port, for example, and is an interface for connecting to external devices. The type and number of external interfaces 63 may be selected as appropriate according to the type and number of external devices to be connected. The external interface 63 may be connected to external devices by cable or wirelessly.

In the present embodiment, the control device 6 is connected to the valves (11, 21) of the actuators (1, 2) via the external interface 63, and controls the driving forces (unloading forces) that are output from the actuators (1, 2). Also, the control device 6 is connected to the sensor 5, the linear encoders (15, 25) and the load cells (30, 40) via the external interface 63, and acquires various information such as information indicating the imbalance between the floor reaction forces, information indicating the muscle contraction rates of the artificial muscles, and the actual measurement values of the unloading forces.

The input device 64 is a device for performing inputs, such as a mouse and a keyboard, for example. Also, the output device 65 is a device for performing outputs, such as a display and a speaker, for example. An operator is able to operate the control device 6, utilizing the input device 64 and the output device 65. The operator is, for example, the user W himself or herself or an assistant who helps with training undertaken by the user W.

The drive 66 is a CD drive or a DVD drive, for example, and is a drive device for loading programs stored in the storage medium 91. The type of drive 66 may be selected as appropriate according to the type of storage medium 91. The control program 90 may be stored in this storage medium 91.

The storage medium 91 is a medium for storing programs or other information by an electrical, magnetic, optical, mechanical or chemical action, such that the recorded programs or other information are readable by computer, device, machine or the like. The control device 6 may acquire the control program 90 from this storage medium 91.

Here, FIG. 5 illustrates a disk-type storage medium such as a CD or DVD as an example of the storage medium 91. However, the type of storage medium 91 need not be limited to disk-type storage media, but may be other than disk-type storage media. Examples of storage media other than disk-type media include semiconductor memory such as flash memory.

Note that, in relation to the specific hardware configuration of the control device 6, constituent elements can be omitted, replaced and added as appropriate according to the embodiment. For example, the control unit 61 may include a plurality of processors. The processors may be constituted by microprocessors, FPGAs (field-programmable gate arrays), DSPs (digital signal processors), and the like. The storage unit 62 may be constituted by the RAM and ROM that are included in the control unit 61. At least one of the external interface 63, the input device 64, the output device 65 and the drive 66 may be omitted. The control device 6 may be constituted by a plurality of computers. In this case, the hardware configurations of the computers may or may not coincide. Also, apart from being an information processing apparatus exclusively designed for the service that is provided, the control device 6 may be a general-purpose PC (personal computer).

Software Configuration

Figure 6:
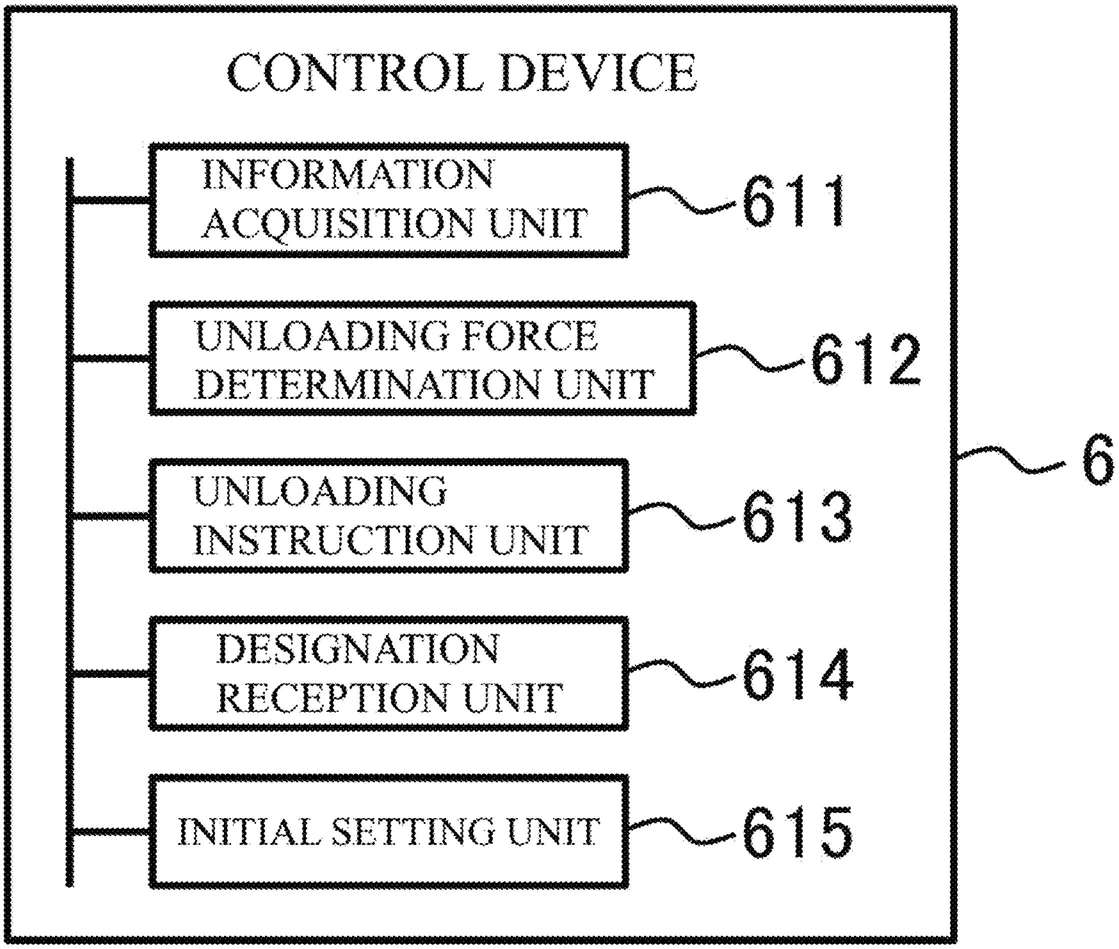
FIG. 6 schematically illustrates an example of the software configuration of the control device according to the embodiment.

Next, an example of the software configuration of the control device 6 according to the present embodiment will be described using FIG. 6. FIG. 6 schematically illustrates an example of the software configuration of the control device 6 according to the present embodiment.

The control unit 61 of the control device 6 extracts the control program 90 stored in the storage unit 62 to the RAM. The control unit 61 then uses the CPU to interpret the commands that are included in the control program 90 extracted to the RAM, and executes information processing corresponding to the commands by controlling the constituent elements. As shown in FIG. 6, the control device 6 according to the present embodiment thereby operates as a computer that is provided with an information acquisition unit 611, an unloading force determination unit 612, an unloading instruction unit 613, a designation reception unit 614, and an initial setting unit 615 as software modules. That is, in the present embodiment, the software modules of the control device 6 are realized by the control unit 61 (CPU).

The information acquisition unit 611 acquires information indicating the imbalance between the floor reaction forces measured by the sensor 5. In the present embodiment, the information acquisition unit 611 further acquires information indicating the respective muscle contraction rates of the artificial muscles constituting the actuators (1, 2) measured by the linear encoders (15, 25). Also, the information acquisition unit 611 acquires information indicating the respective actual measurement values of the unloading forces supplied by the actuators (1 and 2) measured by the load cells (30 and 40).

The unloading force determination unit 612 determines the respective magnitudes of the first unloading force and the second unloading force, according to the imbalance between the floor reaction forces indicated by the acquired information. The unloading instruction unit 613 controls the first actuator 1 and the second actuator 2, so as to generate the first unloading force and the second unloading force at the respectively determined magnitudes.

In the present embodiment, the imbalance between the floor reaction forces is represented by a first ratio of the floor reaction force acting on the leg on the left side to the total of the floor reaction forces acting on both legs, and a second ratio of the floor reaction force acting on the leg on the right side to the total of the floor reaction forces acting on both legs. Determining the respective magnitudes of the first unloading force and the second unloading force includes determining the magnitude of the second unloading force according to the first ratio and determining the magnitude of the first unloading force according to the second ratio.

In the present embodiment, the sensor 5 is constituted by the first sensor 51 and the second sensor 52. Thus, acquiring information indicating the imbalance between the floor reaction forces includes acquiring the value of the first floor reaction force measured by the first sensor 51 and the value of the second floor reaction force measured by the second sensor 52. The first ratio is the ratio of the value of the first floor reaction force to the total value of the first floor reaction force and the second floor reaction force, and the second ratio is the ratio of the value of the second floor reaction force to the total value of the first floor reaction force and the second floor reaction force. Note that, in the present embodiment, the measurement value of the first floor reaction force is the total value of the floor reaction forces that are measured by the first force sensor 511 and the second force sensor 512. Similarly, the measurement value of the second floor reaction force is the total value of the floor reaction forces that are measured by the first force sensor 521 and the second force sensor 522.

The relationship between the ratios and the unloading forces may be determined as appropriate according to the embodiment. In the present embodiment, determining the magnitude of the second unloading force according to the first ratio includes increasing the second unloading force as the first ratio increases, and reducing the second unloading force as the first ratio decreases. Similarly, determining the magnitude of the first unloading force according to the second ratio includes increasing the first unloading force as the second ratio increases, and reducing the first unloading force as the second ratio decreases.

The method of realizing this relationship between the ratios and the unloading forces may be determined as appropriate according to the embodiment. The relationship between the ratios and the unloading forces may be defined by a predetermined function, for example. In the present embodiment, determining the magnitude of the second unloading force according to the first ratio is constituted by computing a first product of the first ratio and a first proportional constant, computing a first sum of the computed first product and a first constant term, and employing the computed first sum as the value of the second unloading force. Similarly, determining the magnitude of the first unloading force according to the second ratio is constituted by computing a second product of the second ratio and a second proportional constant, computing a second sum of the computed second product and a second constant term, and employing the computed second sum as the value of the first unloading force. That is, in the present embodiment, the relationship between the ratios and the unloading forces is represented by a linear function. The constant terms describe the bias of the unloading forces.

Figure 7:
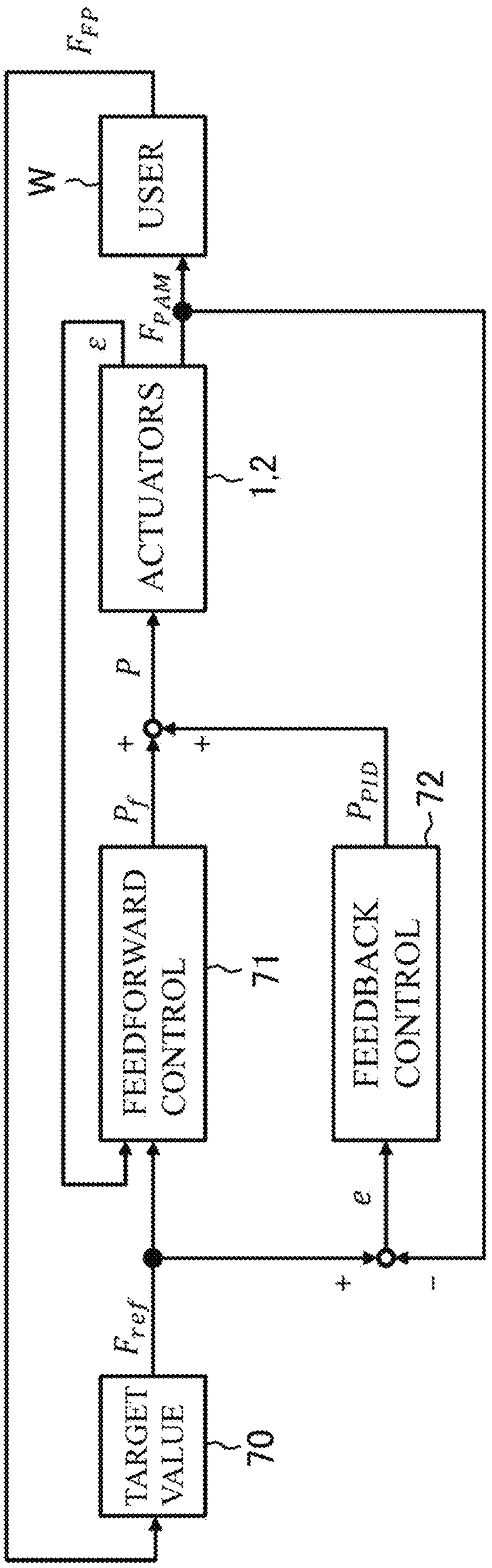
FIG. 7 shows an example of a process of computing the respective unloading forces by the control device according to the embodiment.
Figure 8:
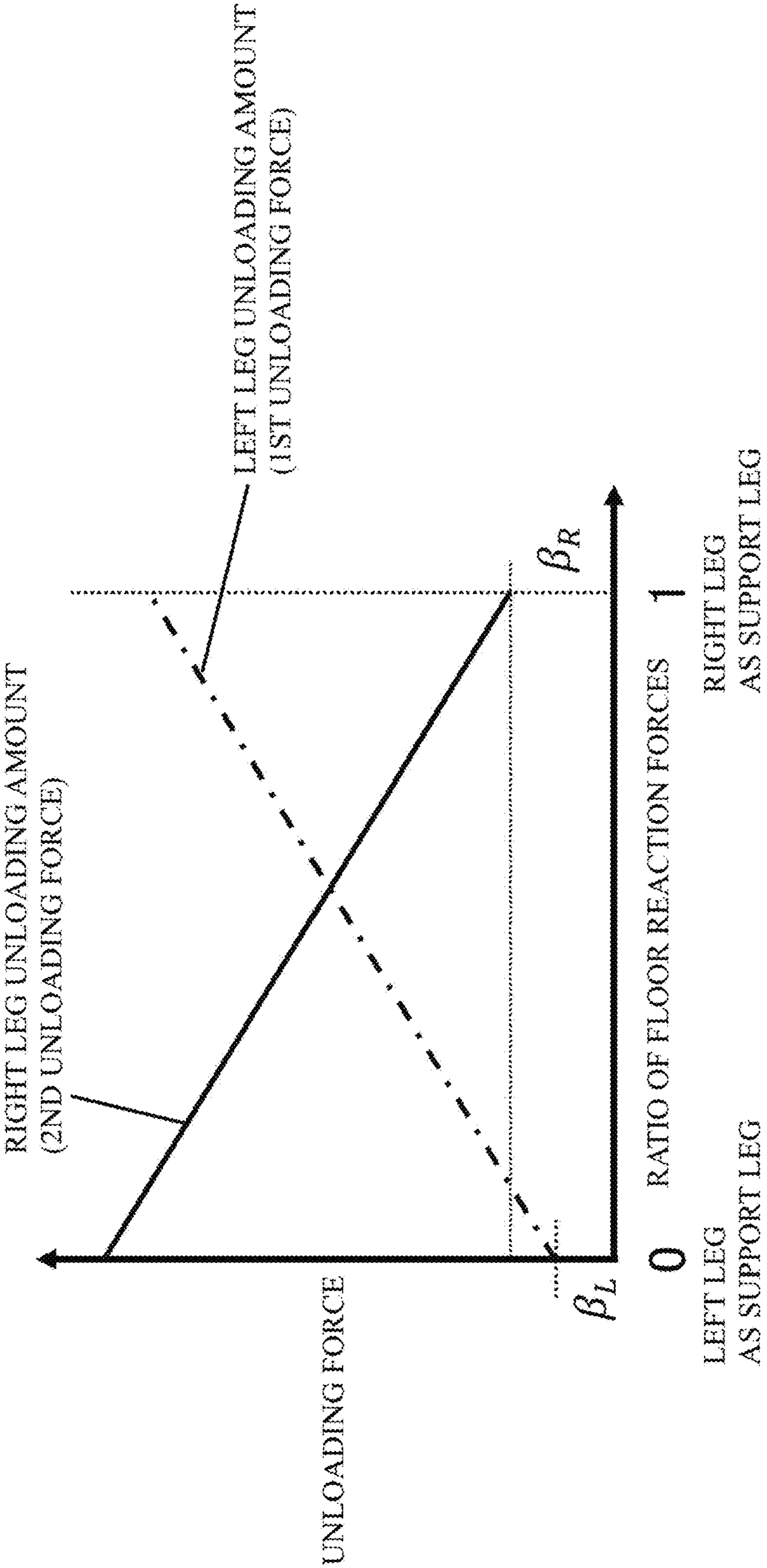
FIG. 8 shows an example of the relationship between the imbalance between floor reaction forces and each unloading force according to the embodiment.

Here, an example of the above process of computing the unloading forces and controlling the actuators (1, 2) will be described in detail using FIGS. 7 and 8. FIG. 7 shows an example of the process of computing the unloading forces and controlling the actuators (1, 2). FIG. 8 shows an example of the relationship between the imbalance between the floor reaction forces and the unloading forces. First, as shown in FIG. 7, the information acquisition unit 611 acquires the respective values of the floor reaction forces measured by the sensors (51 and 52) constituting the sensor 5 as information indicating the imbalance between the floor reaction forces. A value $F_{FP}$ of the floor reaction force is represented by the following Formula 1.

Formula 1

$$F_{FP} = \begin{bmatrix} F_{LH} \\ F_{LT} \\ F_{RH} \\ F_{RT} \end{bmatrix} \quad \text{(Formula 1)}$$

$F_{LH}$ denotes the measurement value that is obtained by the first force sensor 511 of the first sensor 51, and $F_{LT}$ denotes the measurement value that is obtained by the second force sensor 512. In other words, the total value of $F_{LH}$ and $F_{LT}$ is an example of the value of the first floor reaction force. Also, $F_{RH}$ denotes the measurement value that is obtained by the first force sensor 521 of the second sensor 52, and $F_{RT}$ denotes the measurement value that is obtained by the second force sensor 522. That is, the total value of $F_{RH}$ and $F_{RT}$ is an example of the value of the second floor reaction force. The information acquisition unit 611 computes the first ratio and the second ratio by calculating the following Formulas 2 and 3.

Formula 2

$$R_L(F_{FP}) = \frac{F_{LH} + F_{LT}}{F_{LH} + F_{LT} + F_{RH} + F_{RT}} \quad \text{(Formula 2)}$$

Formula 3

$$R_R(F_{FP}) = \frac{F_{RH} + F_{RT}}{F_{LH} + F_{LT} + F_{RH} + F_{RT}} \quad \text{(Formula 3)}$$

$R_L(F_{FP})$ denotes an example of the first ratio, and $R_R(F_{FP})$ denotes an example of the second ratio. That is, in the present embodiment, the first ratio is represented as the ratio of the value of the first floor reaction force to the total value of the first floor reaction force and the second floor reaction force. The second ratio is represented as the ratio of the value of the second floor reaction force to the total value of the first floor reaction force and the second floor reaction force.

Next, the unloading force determination unit 612 determines the magnitudes of the unloading forces (target value 70), according to the respectively obtained ratios. Specifically, using the following Formula 4, the unloading force determination unit 612 determines the magnitude of the second unloading force according to the first ratio, and determines the magnitude of the first unloading force according to the second ratio.

Formula 4

$$f_{Fref}(F_{FP}) = \begin{bmatrix} \alpha_L R_R(F_{FP}) + \beta_L \\ \alpha_R R_L(F_{FP}) + \beta_R \end{bmatrix} = \begin{bmatrix} F_{Lref} \\ F_{Rref} \end{bmatrix} = F_{ref} \quad \text{(Formula 4)}$$

$f_{Fref}(F_{FP})$ denotes an example of a function describing the target value 70. $F_{ref}$ denotes the computed target value 70. $F_{Lref}$ denotes the magnitude of the determined first unloading force. $F_{Rref}$ denotes the magnitude of the determined second unloading force. $\alpha_R$ is an example of the first proportional constant, and $\beta_R$ is an example of the first constant term. $\alpha_L$ is an example of the second proportional constant, and $\beta_L$ is an example of the second constant term.

In the present embodiment, the first proportional constant is set to a positive value. As shown in FIG. 8, the magnitude of the second unloading force can thereby be determined, such that the second unloading force increases as the first ratio increases, and the second unloading force decreases as the first ratio decreases. Similarly, in the present embodiment, the second proportional constant is set to a positive value. The magnitude of the first unloading force can thereby be determined such that the first unloading force increases as the second ratio increases, and the first unloading force decreases as the second ratio decreases. The constant terms ($\beta_R$, $\beta_L$) describe the bias of the unloading forces.

Note that the horizontal axis of the graph shown in FIG. 8 shows the second ratio. In the example in FIG. 8, the total value of the first unloading force and the second unloading force is fixed to a constant predetermined value. In this way, the total value of the first unloading force and the second unloading force may be maintained at a constant predetermined value. Setting of the unloading force need not, however, be limited to such an example. The total value of the first unloading force and the second unloading force need not be fixed to a constant predetermined value.

Next, in order to implement a feedforward control 71, the information acquisition unit 611 acquires information indicating the respective muscle contraction rates of the artificial muscles constituting the actuators (1, 2) that are measured by the linear encoders (15, 25). A muscle contraction rate $\varepsilon$ of each artificial muscle is represented by the following Formula 5.

Formula 5

$$\varepsilon\begin{bmatrix}\varepsilon_L \\ \varepsilon_R\end{bmatrix} \quad \text{(Formula 5)}$$

$\varepsilon_L$ denotes the muscle contraction rate of the first actuator 1 measured by the linear encoder 15. $\varepsilon_R$ denotes the muscle contraction rate of the second actuator 2 measured by the linear encoder 25. The driving forces (unloading forces) that are output by the actuators (1, 2) are respectively determined according to the muscle contraction rates of the artificial muscles and the pressure of air to be applied. In view of this, in order to realize output of a desired unloading force $F_{ref}$ by the feedforward control 71, the unloading instruction unit 613 determines a pressure $P_f$ to be applied to the actuators (1, 2), using the following Formulas 6 to 8.

Formula 6

$$f_{PAM}(F_{ref}, \varepsilon) = \frac{(P_u - P_l)F_{ref} - (P_{ufl} - P_{lfu})}{f_u - f_l} = \begin{bmatrix}P_{Lf} \\ P_{Rf}\end{bmatrix} = P_f) \quad \text{(Formula 6)}$$

Formula 7

$$f_u = a_u\varepsilon^2 + b_u\varepsilon + c_u \quad \text{(Formula 7)}$$

Formula 8

$$f_l = a_l\varepsilon^2 + b_l\varepsilon + c_l \quad \text{(Formula 8)}$$

$f_{PAM}$ ($F_{ref}$, $\varepsilon$) denotes a function for respectively computing the pressure $P_f$ to be applied to the actuators (1, 2) from the target value 70 ($F_{ref}$) of the unloading force and the muscle contraction rates $\varepsilon$ of the artificial muscles. $P_u$ denotes the pressure serving as a reference on the high-pressure side (hereinafter, also referred to as "high-pressure side reference pressure"). $P_l$ denotes the pressure serving as a reference on the low-pressure side (hereinafter, also referred to as "low-pressure side reference pressure"). The high-pressure reference pressure and the low-pressure reference pressure indicate the air pressure utilized in calibrating the artificial muscles. $f_l$ is a proportional constant showing the relationship between the force of the pneumatic artificial muscle and the air pressure at the high-pressure side reference pressure $P_u$. $f_u$ is a proportional constant showing the relationship between the force of the pneumatic artificial muscle and the air pressure at the low-pressure side reference pressure $P_l$. These proportional constants are approximated with a quadratic equation at the respective reference pressures $P_u$ and $P_1$. ($a_u$, $b_u$, $c_u$) and ($a_l$, $b_l$, $c_l$) are coefficients of the quadratic equation used in the approximation. $P_{Lf}$ denotes the pressure of air to be applied to the first actuator 1. $P_{Rf}$ denotes the pressure of air to be applied to the second actuator 2. Note that, in the above description, a model equation of the pneumatic artificial muscle obtained by approximation is given by a quadratic function. However, the model equation need not be limited to such an example. The model equation may be approximated using a higher-order functional equation such as a third or higher order polynomial equation, for example, a trigonometric function, or the like.

Also, in the present embodiment, in order to correct the pressure to be applied to the actuators (1, 2) by a feedback control 72, the information acquisition unit 611 acquires information indicating the actual measurement values of the unloading forces on the legs of the user W that are measured by the load cells (30, 40). An actual measurement value $F_{PAM}$ of each unloading force is represented by the following Formula 9.

Formula 9

$$F_{PAM} = \begin{bmatrix}F_{LPAM} \\ F_{RPAM}\end{bmatrix} \quad \text{(Formula 9)}$$

$F_{LPAM}$ denotes the actual measurement value of the first unloading force that is measured by the load cell 30. $F_{RPAM}$ denotes the actual measurement value of the second unloading force that is measured by the load cell 40. The method of the feedback control 72 need not be particularly limited, and may be selected as appropriate according to the embodiment. A known method such as PI control and PID control may be employed for the feedback control 72.

In the present embodiment, PID control is employed as the feedback control 72. Thus, the unloading instruction unit 613 computes a deviation e between the target value 70 ($F_{ref}$) and the actual measurement value ($F_{PAM}$) of each unloading force, using the following Formula 10. The unloading instruction unit 613 then computes a correction amount $P_{PID}$ of the pressure to be applied to each actuator (1, 2), based on the computed deviation e, using the following Formula 11.

Formula 10

$$e = \begin{bmatrix}e_L \\ e_R\end{bmatrix} = F_{ref} - F_{PAM} = \begin{bmatrix}F_{Lref} - F_{LPAM} \\ F_{Rref} - F_{RPAM}\end{bmatrix} \quad \text{(Formula 10)}$$

Formula 11

$$P_{PID} = \begin{bmatrix}P_{LPID} \\ P_{RPID}\end{bmatrix} = K_p e + K_d\dot{e} + T_i\int e\,dt \quad \text{(Formula 11)}$$

$e_L$ denotes the deviation between the target value 70 and the actual measurement value of the first unloading force. $e_R$ denotes the deviation between the target value 70 and the actual measurement value of the second unloading force. $P_{LPID}$ denotes the correction amount of the pressure to be applied to the first actuator 1. $P_{RPID}$ denotes the correction amount of the pressure to be applied to the second actuator 2. $K_p$ denotes the proportional gain, $K_d$ denotes the differential gain, and $T_i$ denotes the integral gain. The gains may be adjusted experimentally. Adjustment of the gains may be performed by a step response method or a threshold sensitivity method, for example.

The unloading instruction unit 613 determines a value P of the pressure to be applied to the actuators (1, 2), by adding the pressure correction amount $P_{PID}$ determined by the feedback control 72 to the pressure value $P_f$ determined by the feedforward control 71, using the following Formula 12.

Formula 12

$$P = \begin{bmatrix}P_L \\ P_R\end{bmatrix} = P_f + P_{PID} \quad \text{(Formula 12)}$$

$P_L$ denotes the pressure to be applied to the first actuator 1. PR denotes the pressure to be applied to the second actuator 2. The unloading instruction unit 613 regulates the pressure of air that is output to the actuators (1, 2) from the compressor CP via the valves (11, 21), by giving instructions to the valves (11, 21). The unloading instruction unit 613 thereby controls the actuators (1, 2), such that the determined pressure P is applied to each actuator (1, 2) and the desired unloading force is output from each actuator (1, 2).

Returning to FIG. 6, the designation reception unit 614 receives designation of the values of parameters for determining the unloading forces such as constant terms of Formula 4. The initial setting unit 615 controls the valves (11, 21) so as to apply compressed air at a predetermined pressure to the actuators (1, 2), after the proximal ends (31, 41) of the support members (3, 4) are fitted to the user W. The initial setting unit 615 then outputs an instruction to the operator via the output device 65 to tension the support members (3, 4) such that the muscle contraction rates that are measured by the linear encoders (15 and 25) respectively attain a predetermined value. The initial setting unit 615 thereby implements initial setting of the artificial muscles constituting the actuators (1, 2).

The software modules of the control device 6 will be described in detail with an operation example described below. Note that, in the present embodiment, an example will be described in which the software modules of the control device 6 are realized by a general-purpose CPU. However, some or all of the above software modules may be realized by one or a plurality of dedicated processors. Also, in relation to the software configuration of the control device 6, software modules may be omitted, replaced and added as appropriate according to the embodiment.

2. Operation Example

Figure 9:
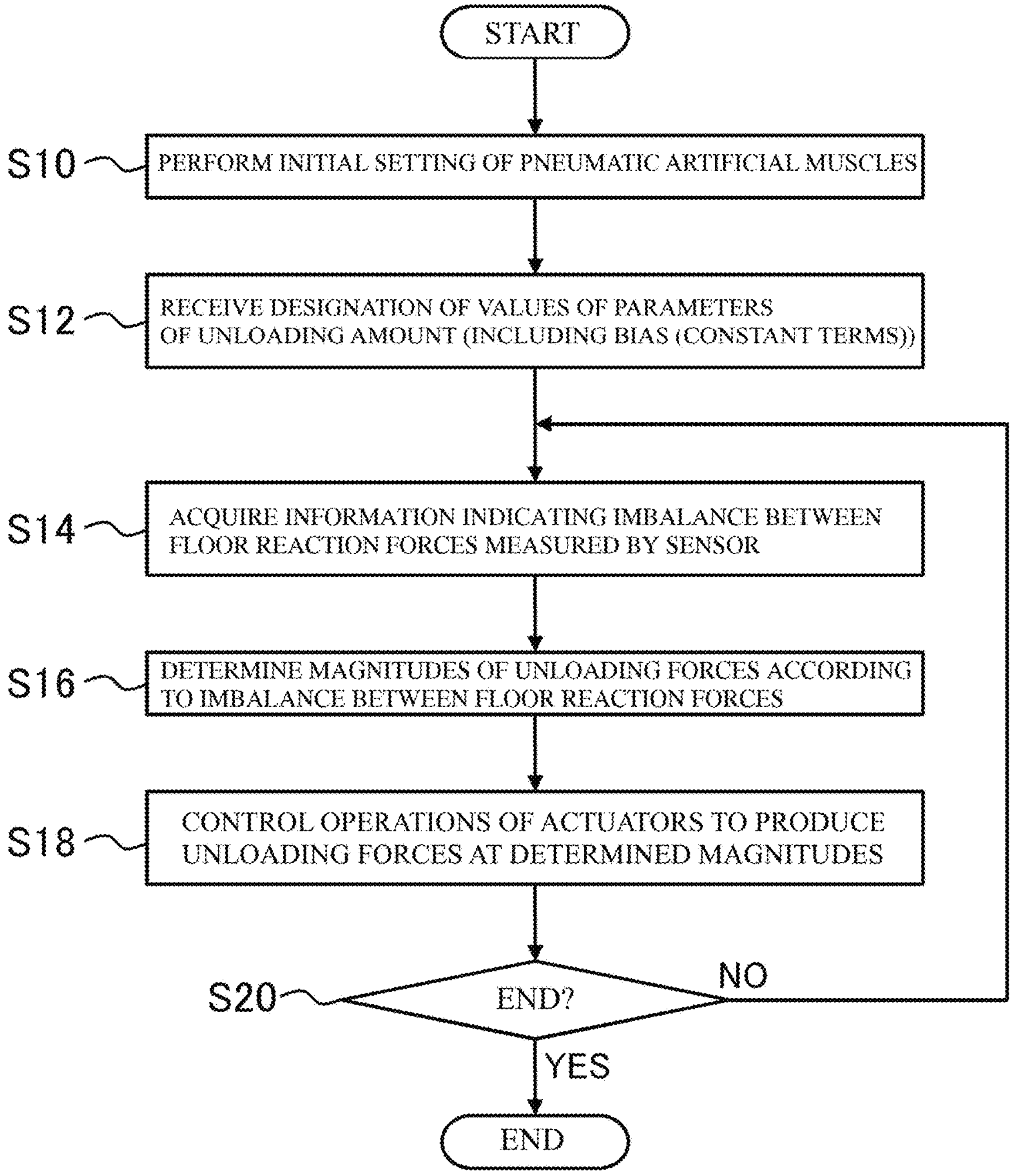
FIG. 9 shows an example of a processing procedure relating to body weight unloading by the control device according to the embodiment.

Next, an operation example of the body weight unloading apparatus 100 will be described using FIG. 9. FIG. 9 is a flowchart showing an example of a processing procedure relating to body weight unloading by the control device 6 according to the present embodiment. The processing procedure described below is an example of a control method. The processing procedure described below is, however, merely an example, and the respective processing may be changed to the greatest extent possible. Also, with regard to the processing procedure described below, processing can be omitted, replaced and added as appropriate according to the embodiment.

Preliminary Preparation

First, the user W moves under the beam part F3 of the suspender FL and fits the proximal ends (31, 41) of the support members (3, 4) to the vicinity of his or her waist. For example, the proximal ends (381, 391) of the ropes (38, 39) of the first support member 3 may each be provided with a rope ratchet. The user W may attach the rope ratchets of the proximal ends (381, 391) to a holder provided in the vicinity of his or her waist on the left half of the body. Similarly, the proximal ends (481, 491) of the ropes (48, 49) of the second support member 4 may each be provided with a rope ratchet. The user W may attach the rope ratchets of the proximal ends (481, 491) to a holder provided in the vicinity of his or her waist on the right half of the body. The user W is thereby able to fit the proximal ends (31, 41) of the support members (3, 4) to the vicinity of his or her waist. An assistant may help with this fitting. The control device 6 may be configured to recognize that the proximal ends (31, 41) of the support members (3, 4) are fitted to the user W, by an operation by the operator via the input device 64, for example. In response, the control device 6 may execute the following information processing.

Step S10

In step S10, the control unit 61 operates as the initial setting unit 615, and outputs an instruction for performing initial setting of the actuators (1 and 2) to the output device 65. As an example, the control unit 61 controls the valves (11, 21) so as to apply compressed air at a predetermined pressure to the actuators (1, 2), after the proximal ends (31, 41) of the support members (3, 4) are fitted to the user W. The control unit 61 then outputs an instruction for prompting tensioning of the support members (3, 4) to the output device 65 such that the muscle contraction rate that is measured by each linear encoder (15, 25) attains a predetermined value. The operator tensions the support members (3, 4) such that the muscle contraction rate of each artificial muscle attains a predetermined value, by appropriately adjusting the length of each rope (37-39, 47-49). Initial setting of the artificial muscles constituting the actuators (1, 2) is thereby completed.

The driving force of a pneumatic artificial muscle is determined by the air pressure that is applied to the artificial muscle and the muscle contraction rate of the artificial muscle. The change in driving force due to variation in the muscle contraction rate decreases when the applied air pressure is low, and the change in driving force due to variation in the muscle contraction rate increases when the applied air pressure is high. Similarly, the change in driving force due to variation in the air pressure is low in a state where the muscle contraction rate is high, and the change in driving force due to variation in the air pressure increases in a state where the muscle contraction rate is low. Thus, the air pressures and muscle contraction rates being properly set is desirable in controlling the driving force. According to this initial setting, the state of the artificial muscle of each actuator (1, 2) can be initialized to be suitable for controlling the unloading force. In step S18 described later, the unloading force that is generated for each leg of the user W can thereby be easily controlled.

Note that the predetermined values of the pressures and muscle contraction rates that are applied to the actuators (1 and 2) may be set as appropriate according to the embodiment. The predetermined values may be provided by setting values in the control program 90, or may be provided through input by the operator via the input device 64. The control unit 61 recognizes that the initial setting of the artificial muscles is completed, based on the measurement values of the muscle contraction rates that are obtained from the linear encoders (15 and 25) attaining the predetermined values. Once the initial setting of the artificial muscles is completed, the control unit 61 advances the processing to the next step S12.

Step S12

In step S12, the control unit 61 operates as the designation reception unit 614, and receives designation of the values of parameters of the unloading amount including the constant terms ($\beta_R$, $\beta_L$) of Formula 4. The operator inputs the values of the parameters, using the input device 64.

In the present embodiment, the total value of the first unloading force and the second unloading force may be maintained at a constant predetermined value. In response, the control unit 61 may receive designation of the values of the constant terms ($\beta_R$, $\beta_L$) and the total value, as the parameters of the unloading amount. In the present embodiment, the target value 70 of each unloading force is computed by calculating the above Formula 4. Thus, in the case where the total value of the first unloading force and the second unloading force is maintained at a constant predetermined value, the proportional constants ($\alpha_R$, $\alpha_L$) are specified as the same value "(total value)−($\beta_R$+$\beta_L$)". In this case, the magnitudes of the unloading forces on the legs can be easily adjusted, by changing the values of the constant terms ($\beta_R$, $\beta_L$).

Note that, in the case where the sum of the constant terms ($\beta_R$, $\beta_L$) is greater than the total value of the first unloading force and the second unloading force, the value of the proportional constants ($\alpha_R$, $\alpha_L$) will be negative, making it difficult to reduce the unloading force on the leg when the leg is the support leg, and to increase the unloading force on the leg when the leg is the swing leg. Thus, in the case where the sum of the designated constant terms ($\beta_R$, $\beta_L$) is greater than the designated total value, the control unit 61 may return an error and again receive designation of the values of the parameters.

Designation of the values of the parameters need not, however, be limited to such an example. The control unit 61 may receive designation of the values of the constant terms ($\beta_R$, $\beta_L$) whose sum is greater than the total value of the first unloading force and the second unloading force. Also, the total value of the first unloading force and the second unloading force need not be maintained at a constant predetermined value. In this case, the control unit 61 may further receive designation of the values of the proportional constants ($\alpha_R$, $\alpha_L$), as parameters of the unloading amount.

Note that, according to test examples described later, in the case where the user W is a hemiplegic patient, the bilateral balance of the gait cycle can be improved when the unloading force applied to the leg on the unaffected side is increased to greater than the unloading force applied to the leg on the paralyzed side. Thus, in order to improve the bilateral balance of the gait cycle, it is preferable to set the constant term on the unaffected side to a larger value than the constant term on the paralyzed side. Once reception of designation of the values of the parameters is completed, the control unit 61 advances the processing to the next step S14.

Step S14

In step S14, the control unit 61 operates as the information acquisition unit 611, and acquires information indicating the imbalance between the floor reaction forces measured by the sensor 5. In the present embodiment, the sensor 5 is constituted by the first sensor 51 and the second sensor 52. Thus, the control unit 61 acquires information indicating the value of the first floor reaction force measured by the first sensor 51 and the value of the second floor reaction force measured by the second sensor 52, as information indicating the imbalance between the floor reaction forces.

More specifically, the sensors (51, 52) are respectively constituted by the first force sensors (511, 521) and the second force sensors (512, 522). The control unit 61 acquires information indicating the values $F_{FP}$ of the floor reaction forces measured by the force sensors (511, 512, 521, 522). The control unit 61 then computes the first ratio $R_L$ ($F_{FP}$) and the second ratio $R_R(F_{FP})$, in accordance with the above Formulas 2 and 3. The control unit 61 thereby acquires information indicating the first ratio $R_L$ ($F_{FP}$) and the second ratio $R_R(F_{FP})$, as information indicating the imbalance between the floor reaction forces.

Also, the control unit 61 acquires, for the feedforward control 71, information indicating the muscle contraction rates ε of the artificial muscles constituting the actuators (1, 2) measured by the linear encoders (15, 25). Specifically, the lengths of the artificial muscles constituting the actuators (1, 2) can be measured by the linear encoders (15, 25). The control unit 61 is able to derive the muscle contraction rate of each artificial muscle from this measurement value. For example, the control unit 61 is able to derive the muscle contraction rate ε, using the following Formula 13.

Formula 13

$$\varepsilon=(L_0-L)/L_0 \quad \text{(Formula 13)}$$

$L_0$ denotes the natural length of the artificial muscles and is given in advance by the specifications of the artificial muscles. L denotes the length of the artificial muscles that is measured by the linear encoders (15, 25). The control unit 61 is able to compute the muscle contraction rate ε, by substituting the measurement values of the lengths of the artificial muscles that are obtained by the linear encoders (15, 25) into Formula 13, and executing the computation of Formula 13.

Furthermore, the control unit 61 acquires, for the feedback control 72, information indicating the actual measurement values $F_{PAM}$ of the unloading forces supplied by the actuators (1, 2) that are measured by the load cells (30, 40).

Note that the path for acquiring the respective information need not be particularly limited, and may be selected as appropriate according to the embodiment. For example, the sensor 5, the linear encoders (15, 25) and the load cells (30, 40) may be directly connected to the control device 6 via the external interface 63. In this case, the control unit 61 may acquire the respective information directly from the sensor 5, the linear encoders (15, 25) and the load cells (30, 40) via the external interface 63. Alternatively, the sensor 5, the linear encoders (15, 25), and the load cells (30, 40) may be connected to another computer. In this case, the control unit 61 may indirectly acquire the respective information from the sensor 5, the linear encoders (15, 25) and the load cells (30, 40), via the other computer.

Once the respective information is acquired, the control unit 61 advances the processing to the next step S16.

Step S16

In step S16, the control unit 61 operates as the unloading force determination unit 612, and determines the respective magnitudes of the first unloading force ($F_{Lref}$) and second unloading force ($F_{Rref}$), according to the imbalance between the floor reaction forces indicated by the acquired information.

In the present embodiment, the control unit 61 substitutes the constant terms ($\beta_R$, $\beta_L$) designated in step S12 and the proportional constants ($\alpha_R$, $\alpha_L$) specified or designated in step S12 into Formula 4. Furthermore, the control unit 61 substitutes the values ($R_L(F_{FP})$, $R_R$ ($F_{FP}$)) of the ratios acquired in step S14 into Formula 4. The control unit 61 then computes the respective target values 70 of the unloading forces $F_{ref}$, or in other words, determines the respective magnitudes of the unloading forces $F_{ref}$, by executing the computation of Formula 4. Once the respective magnitudes of the unloading forces $F_{ref}$ are determined, the control unit 61 advances the processing to the next step S18.

Note that, when the total of the values the designated constant terms ($\beta_R$, $\beta_L$), in the case where the total of the first unloading force and the second unloading force is maintained at a constant predetermined value, the values of the proportional constants ($\alpha_R$, $\alpha_L$) will be negative, in order to determine the respective magnitudes of the unloading forces $F_{ref}$ in accordance with Formula 4. The control unit 61 may determine the respective magnitudes of the unloading forces $F_{ref}$ in accordance with Formula 4, using these proportional constants ($\alpha_R$, $\alpha_L$) which are negative values.

In the case where the absolute values of the specified proportional constants ($\alpha_R$, $\alpha_L$) are greater than the absolute value of one of the constant terms ($\beta_R$, $\beta_L$), there is a possibility that an unloading force exceeding the sum of the constant terms ($\beta_R$, $\beta_L$) will be supplied to the user W. In order to prevent this, in the case where the total of the designated values of the constant terms ($\beta_R$, $\beta_L$) is greater than or equal to the predetermined value, the control unit 61 may determine the respective magnitudes of the unloading forces $F_{ref}$, according to the ratio of the designated values of the constant terms ($\beta_R$, $\beta_L$).

Even in the case where the total of the constant terms ($\beta_R$, $\beta_L$), that is, the total bias of the unloading forces, exceeds a predetermined value, it is thereby ensured that the total of the unloading forces that are supplied to the legs does not exceed a constant predetermined value, and an unloading force exceeding the desired magnitude can be prevented from acting on the user W. Also, by determining the respective magnitudes of the unloading forces $F_{ref}$ according to the ratio of the constant terms ($\beta_R$, $\beta_L$), unloading forces that correspond to the intent of the settings of the constant terms ($\beta_R$, $\beta_L$) can be applied to the legs of the user W.

Step S18

In step S18, the control unit 61 operates as the unloading instruction unit 613, and controls the first actuator 1 and the second actuator 2, so as to generate the first unloading force ($F_{Lref}$) and the second unloading force ($F_{Rref}$) at the respectively determined magnitudes.

In the present embodiment, the control unit 61, by the feedforward control 71, determines the pressure $P_f$ to be applied to the actuators (1 and 2), in accordance with Formulas 6 to 8, in order to realize output of the desired unloading force $F_{ref}$. In the feedforward control 71, the values of the unloading forces $F_{ref}$ determined in step S16 and information indicating the muscle contraction rates ε of the artificial muscles obtained in step S14 are utilized.

Also, the control unit 61, by the feedback control 72, computes the correction amount $P_{PID}$ of the pressure to be applied to each actuator (1, 2), based on the deviation e between the target value 70 ($F_{ref}$) and the actual measurement value ($F_{PAM}$) of the unloading force, in accordance with Formulas 10 and 11. In the feedback control 72, information indicating the values of the unloading forces $F_{ref}$ determined in step S16 and the actual measurement values $F_{PAM}$ of the unloading forces obtained in step S14 are utilized.

The control unit 61 then determines the value P of the pressure to be applied to each actuator (1, 2), by adding the pressure correction amount $P_{PID}$ determined by the feedback control 72 to the value $P_f$ of the pressure determined by the feedforward control 71, in accordance with Formula 12. The control unit 61 regulates the pressure of air that is output to the actuators (1, 2) from the compressor CP via the valves (11, 21) by giving instructions to the valves (11, 21). The control unit 61 thereby controls the operations of the actuators (1, 2), such that the desired driving force (unloading force) is output from each actuator (1 and 2). Once output of the driving forces is completed, the control unit 61 advances the processing to the next step 20.

Step S20

In step S20, the control unit 61 determines whether to end control of the operations of the actuators (1 and 2). The trigger for ending control may be set as appropriate according to the embodiment.

For example, the control unit 61 may receive designation to end control via the input device 64. In this case, while designation to end control is not being input via the input device 64, the control unit 61 determines not to end control of the actuators (1, 2). On the other hand, once designation to end control is input via the input device 64, the control unit 61 determines to end control of the actuators (1, 2).

Also, for example, a time period for continuing control of the actuators (1, 2) (hereinafter, simply referred to as "continuation period") may be set. In this case, until the continuation period elapses, the control unit 61 determines not to end control of the actuators (1, 2). On the other hand, once the continuation period has elapsed, the control unit 61 determines to end control of the actuators (1, 2).

Note that the continuation period may be designated through input by the operator via the input device 64, or may be provided by a setting value within the control program 90. In the case of receiving input of a continuation period, the setting of the continuation period may be performed in step S12, or may be performed separately from the above step S12. The control unit 61 may include a timer (not shown), in order to measure the elapsed time after controlling the operations of the actuators (1 and 2).

In the case where it is determined not to end control, the control unit 61 repeats the processing from step S14. On the other hand, in the case where it is determined to end control, the control unit 61 ends the series of processing according to this operation example.

3. Features

As described above, according to the present embodiment, actuators (first actuator 1 and second actuator 2) that supply unloading forces that act on the legs of the user W are provided separately. During the walking period, the imbalance between the floor reaction forces that are required on the legs of the user W is measured by the sensor 5. The control device 6 then, in the processing of steps S14 to S18, determines the magnitude of each unloading force, according to the imbalance between the floor reaction forces that are measured, and controls the operations of the actuators (1, 2), so as to generate the unloading forces at the respectively determined magnitudes. That is, the unloading forces on the legs of the user W can be individually and dynamically adjusted, as shown in FIG. 8, for example, using the imbalance between the floor reaction forces during the walking period as usage. Accordingly, with the body weight unloading apparatus 100 of the present embodiment, the unloading forces on the left and right legs of the user W can be independently and dynamically changed during the walking period.

Also, in the present embodiment, the control device 6, in the above step S16, determines the magnitude of the second unloading force ($F_{Rref}$) on the right leg, according to the first ratio ($R_L(F_{FP})$) of the floor reaction force acting on the left leg. The control device 6 determines the magnitude of the first unloading force ($F_{Lref}$) on the left leg, according to the second ratio ($R_R(F_{FP})$) of the floor reaction force acting on the right leg. The magnitude of the unloading force that is applied to the swing leg can thereby be determined according to the floor reaction force on the support leg.

Also, in the present embodiment, by setting the proportional constants ($\alpha_R$, $\alpha_L$) to a positive value, the second unloading force ($F_{Rref}$) can be increased or decreased, in response to an increase or decrease in the first ratio ($R_L(F_{FP})$). Also, the first unloading force ($F_{Lref}$) can be increased or decreased, in response to an increase or decrease in the second ratio ($R_R(F_{FP})$). That is, the magnitude of the unloading force on each leg can be controlled, such that the unloading force on the leg decreases when the leg is the support leg, and the unloading force on the leg increases when the leg is the swing leg. An unloading force can thereby be generated so as to comparatively strongly support the action of lifting the legs during the walking motion. Also, a scenario in which a hemiplegic patient uses the body weight unloading apparatus 100 according to the present embodiment is assumed. In this scenario, weight transfer from the unaffected side to the paralyzed side can be promoted, by controlling the above unloading forces, when the user starts support with the leg on the paralyzed side. The balance during bilateral support can thereby by improved, by increasing the proportion of time spent supporting the leg on the paralyzed side.

Also, in the present embodiment, the relationship between the ratios ($R_L(F_{FP})$, $R_R(F_{FP})$) and the unloading forces ($F_{Rref}$, $F_{Lref}$) is given by a linear function that is described by the proportional constants ($\alpha_R$, $\alpha_L$) and the constant terms ($\beta_R$, $\beta_L$). Accordingly, the magnitudes of the unloading forces that are supplied to the legs of the user W can be easily adjusted, by the proportional constants ($\alpha_R$, $\alpha_L$) and the constant terms ($\beta_R$, $\beta_L$), thereby enabling a training program to be created, according to various states of the user W.

Also, in the present embodiment, in the support members (3, 4), the body of the user W is lifted up from the front and back, by the second ropes (38, 48) and the third ropes (39, 49). Additionally, the second ropes (38, 48) and the third ropes (39, 49) are joined to the first end parts (361, 461) and the second end parts (362, 462) of the couplers (36, 46) in which the raised parts (363, 463) are further oriented upward. Swaying in the front-back direction can thereby be inhibited, and the body of the user W can be stably lifted up. Also, due to the width of the holding parts (F4, F5) being slightly narrower than the shoulder width of the user W, the support members (3, 4) are disposed on the inner side with respect to the shoulders of the user W, and the body of the user W can be lifted up from the inner side of the shoulders. The support members (3, 4) can thereby stably support the body of the user W. Furthermore, due to the couplers (36, 46) being formed to have a dog-legged shape and being disposed so as to point upward, space around the shoulders of the user W can be secured. The user W is thereby able to easily move his or her shoulders and swing his or her arms during the walking motion. That is, the user W can be easily encouraged to adopt a natural walking motion.

4. Modifications

An embodiment of the present invention has been described in detail above, but the description given above is merely an illustrative example of the present invention in all respects. Needless to say, various improvements and modifications can be made without departing from the scope of the invention. Changes such as the following can be made, for example. Note that, in the following, similar reference signs are used for constituent elements that are similar to the above embodiment, and description of similar points to the above embodiment will be omitted as appropriate. The following modifications can be combined as appropriate.

4.1

In the above embodiment, pneumatic artificial muscles are used for the actuators (1, 2). However, the type of actuators (1, 2) need not be limited to pneumatic artificial muscles. The type of actuators (1, 2) need not be particularly limited as long as unloading forces can be supplied, and may be selected as appropriate according to the embodiment. For example, pneumatic cylinders, wire-wound motors, series elastic actuators, hydraulic pistons, ball screws or direct-drive motors may be used for the actuators (1, 2). Different types of actuators may also be used for the first actuator 1 and the second actuator 2. Also, the actuators (1, 2) may be constituted by one or a plurality of actuators. In the case where the actuators have two or more outputs, one of the output portions may be utilized as the first actuator 1 and another output portion may be utilized as the second actuator 2. For example, a pneumatic cylinder that performs a reciprocating motion is able to extract output from two directions. In this case, the reciprocating motion is corresponded to the imbalance between the floor reaction forces, and outputs in the respective directions may be extracted as outputs of the first actuator 1 and the second actuator 2.

Also, the valves (11, 21) and the compressor CP are utilized as a configuration for controlling the air pressure that is supplied to the artificial muscles of the actuators (1, 2). However, the configuration for controlling the air pressure that is supplied to the artificial muscles need not be limited to such an example, and may be determined as appropriate according to the embodiment. For example, separate compressors may be provided for the actuators (1, 2).

4.2

In the above embodiment, the suspender FL includes the pair of column parts (F1, F2), the beam part F3, and the pair of holding parts (F4, F5). However, the configuration of the suspender FL need not be limited to such an example as long as the support members (3, 4) can be suspended, and may be determined as appropriate according to the embodiment. Also, in the case where the support members (3, 4) are suspended by another member such as a building installation, the suspender FL may be omitted. Also, the interval between the pair of holding parts (F4, F5) may be wider than the shoulder width of the user W. The support members (3, 4) may thereby be disposed on the outer side of the shoulders of the user W, and the unloading forces may be generated toward the outer side with respect to the body of the user W.

Also, in the above embodiment, the support members (3, 4) include the cables (35, 45), the couplers (36, 46), the first ropes (37, 47), the second ropes (38, 48), and the third ropes (39, 49). However, the configuration of the support members (3, 4) need not be particularly limited as long as the unloading forces that are supplied from the actuators (1, 2) can be transmitted to the legs of the user W, and may be determined as appropriate according to the embodiment. Also, the support members (3, 4) may further provided with a restraint that inhibits the couplers (36, 46) from swinging side to side and rotating.

Figure 10:
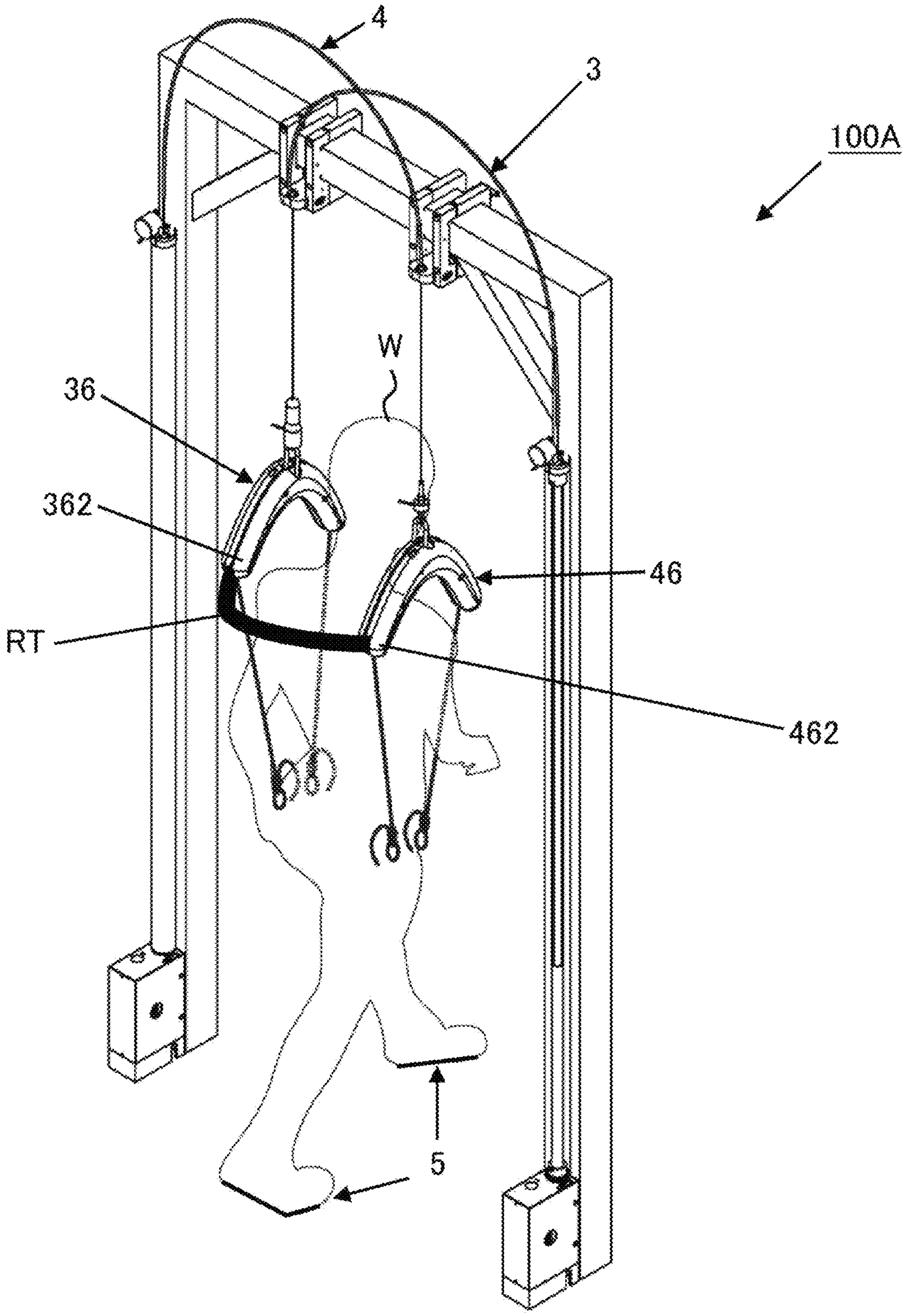
FIG. 10 schematically illustrates an example of a body weight unloading apparatus according to another embodiment.

FIG. 10 schematically illustrates an example of a body weight unloading apparatus 100A according to this modification. In this modification, the body weight unloading apparatus 100A is further provided with a restraint RT. Except for this point, the body weight unloading apparatus 100A according to this modification is constituted similarly to the body weight unloading apparatus 100 according to the above embodiment. In the example in FIG. 10, the restraint RT couples the second end parts (362, 462) of the couplers (36, 46). The restraint RT thereby inhibits the couplers (36, 46) from swinging side to side and rotating. The coupling position of the restraint RT need not, however, be limited to such an example as long as the couplers (36, 46) can be inhibited from swinging side to side and rotating, and may be determined as appropriate according to the embodiment. Note that the material of this restraint RT need not be particularly limited, and may be selected as appropriate according to the embodiment. For example, a material having elasticity or damping properties such as a leaf spring or urethane resin may be used for the restraint RT.

Figure 11A:
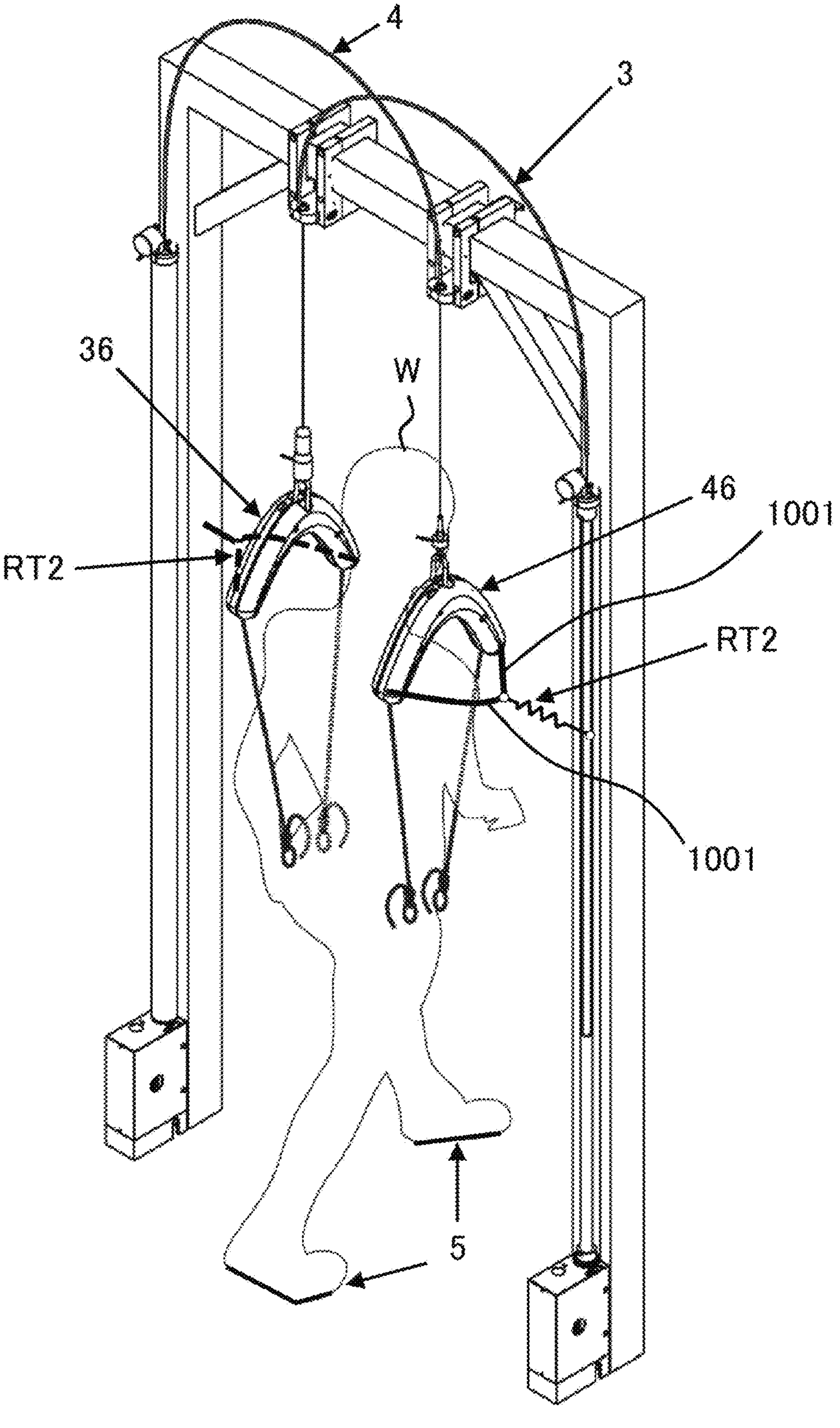
FIG. 11A schematically illustrates an example of a body weight unloading apparatus according to another embodiment.

FIG. 11A schematically illustrates an example of a body weight unloading apparatus provided with a restraint RT2 according to another embodiment.

Figure 11B:
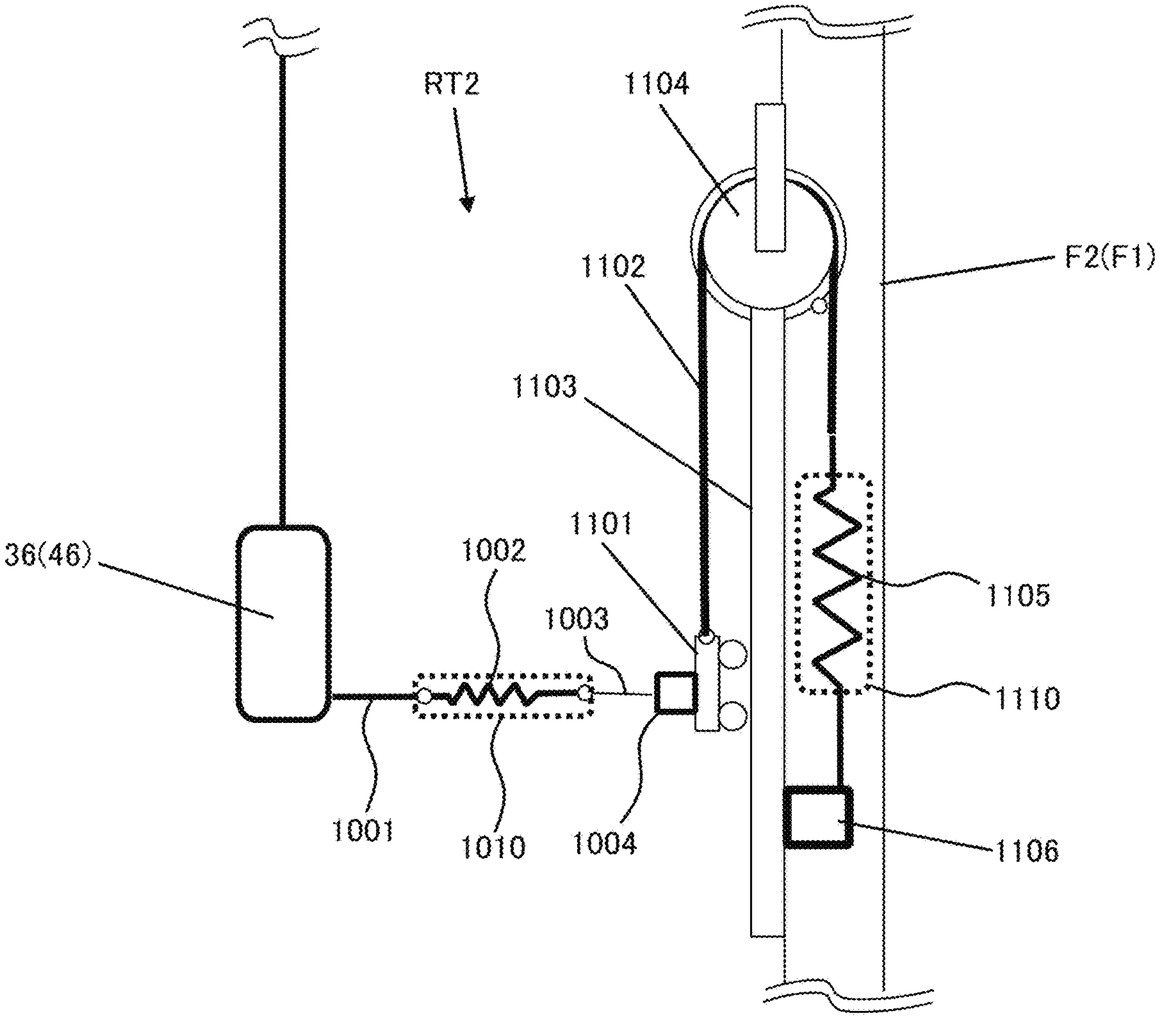
FIG. 11B schematically illustrates an example of the configuration of a restraint.

FIG. 11B schematically illustrates an example of the configuration of the restraint RT2. The body weight unloading apparatus according to this modification is provided with a pair of restraints RT2. In other words, one restraint RT2 is provided for each coupler (36, 46). The restraint RT2 on the right side is configured to restrain the coupler 46, by coupling the coupler 46 on the right side to the column part F1 on the right side. The restraint RT2 on the left side is configured to restrain the coupler 36, by coupling the coupler 36 on the left side to the column part F2 on the left side.

Each restraint RT2 includes a pair of first coupling cords 1001, a spring 1002, a second coupling cord 1003, and an attachment part 1004. One end of the first coupling cords 1001 of the restraint RT2 is joined to the respective ends (361, 362) (461, 462) of the couplers (36) (46), and the other end of the first coupling cords 1001 is joined to one end of the spring 1002. One end of the second coupling cord 1003 is joined to the other end of the spring 1003, and the other end of the second coupling cord 1003 is joined to the attachment part 1004. The coupling cords (1001, 1003) may be configured to be adjustable in length. The attachment part 1004 is configured to be couplable to the column parts (F1, F2). The attachment part 1004 may be constituted by a magnet, for example. In this case, the attachment part 1004 is configured to be couplable to the column parts (F1, F2) by magnetic force. According to this restraint RT2, movement of the couplers (36, 46) (particularly rotational swing) can be restrained, by coupling the couplers (36, 46) to the column parts (F2, F1) while tensioning with the spring 1002. As a result, it can be ensured that the couplers (36, 46) to not hit the face and body of the user W during the walking motion.

Furthermore, in this modification, a guide rail 1103 extending vertically is provided and a track 1101 on which this guide rail 1103 is slidable is disposed, on the inner side of the column parts (F1, F2). One end of a cord 1102 is joined to the track 1101. The cord 1102 is wrapped around a pulley 1104 provided upward of the track 1101 of the column parts (F1, F2). One end of the spring 1105 is joined to the other end of the cord 1102, and the other end of the spring 1105 is coupled to a fixing part 1106 via a cord. The configuration of the fixing unit 1106 may be freely determined. As a result of the column parts (F1, F2) having these constituent elements, the track 1101 is configured to be positionally adjustable in the vertical direction by the action of the spring 1105. The attachment part 1004 of the restraint RT2 is thereby able to move up and down, in response to vertical movement of the couplers (36 and 46). As a result, even when the vertical position of the couplers (36, 46) is changed due to swaying of the body due to the walking motion, the user W changing and the like, movement of the couplers (36, 46) can be restrained as appropriate by the restraint RT2.

The periphery of each spring (1002, 1105) may be covered by a braided tube (1010, 1110). The springs (1002, 1105) can thereby be kept from swinging even without using a damper or the like. Also, pinching of the springs (1002, 1105) can be prevented.

Note that the configurations of the restraint RT2 and the column parts (F1, F2) need not be limited to such an example. For example, the attachment part 1004 may be directly coupled (fixed) to the column parts (F1, F2). Also, for example, the pulley 1104 may be omitted, and the track 1101 may be configured to be positionally adjustable up and down with a method other than the pulley 1104.

4.3

In the above embodiment, the sensor 5 is constituted by force sensors (511, 512, 521, 522). However, the sensor 5 need not be particularly limited in type as long as the imbalance between the floor reaction forces respectively acting on the legs of the user W can be measured, and may be selected as appropriate according to the embodiment. Motion captures, tilt sensors, myoelectric sensors and pressure distribution sensors, for example, may be used for the sensor 5, apart from force sensors. The tilt sensors may be constituted by acceleration sensors and gyro sensors, for example. These tilt sensors are able to measure the imbalance between the floor reaction forces, by being fitted to the hips or the like of the user W. The myoelectric sensors may be fitted to the legs of the user W, for example. The floor reaction force (particularly vertical load) acting on the legs of the user W can be estimated, through the myoelectricity that is measured by the myoelectric sensors. Also, sensors that measure partial pressure such as pressure sensors (FSR (force sensing resistors), PVDF film, etc.), for example, may be used. In this case, the measurement value of the partial pressure that is obtained by the sensor may be treated approximately as the measurement value of the floor reaction force. Also, in the above embodiment, the imbalance between the floor reaction forces is derived from the values of the floor reaction forces respectively acting on the soles of the feet of the legs that are measured by the force sensors (511, 512, 521, 522). However, the method of deriving the imbalance between the floor reaction forces need not be limited to such an example.

Figure 12:
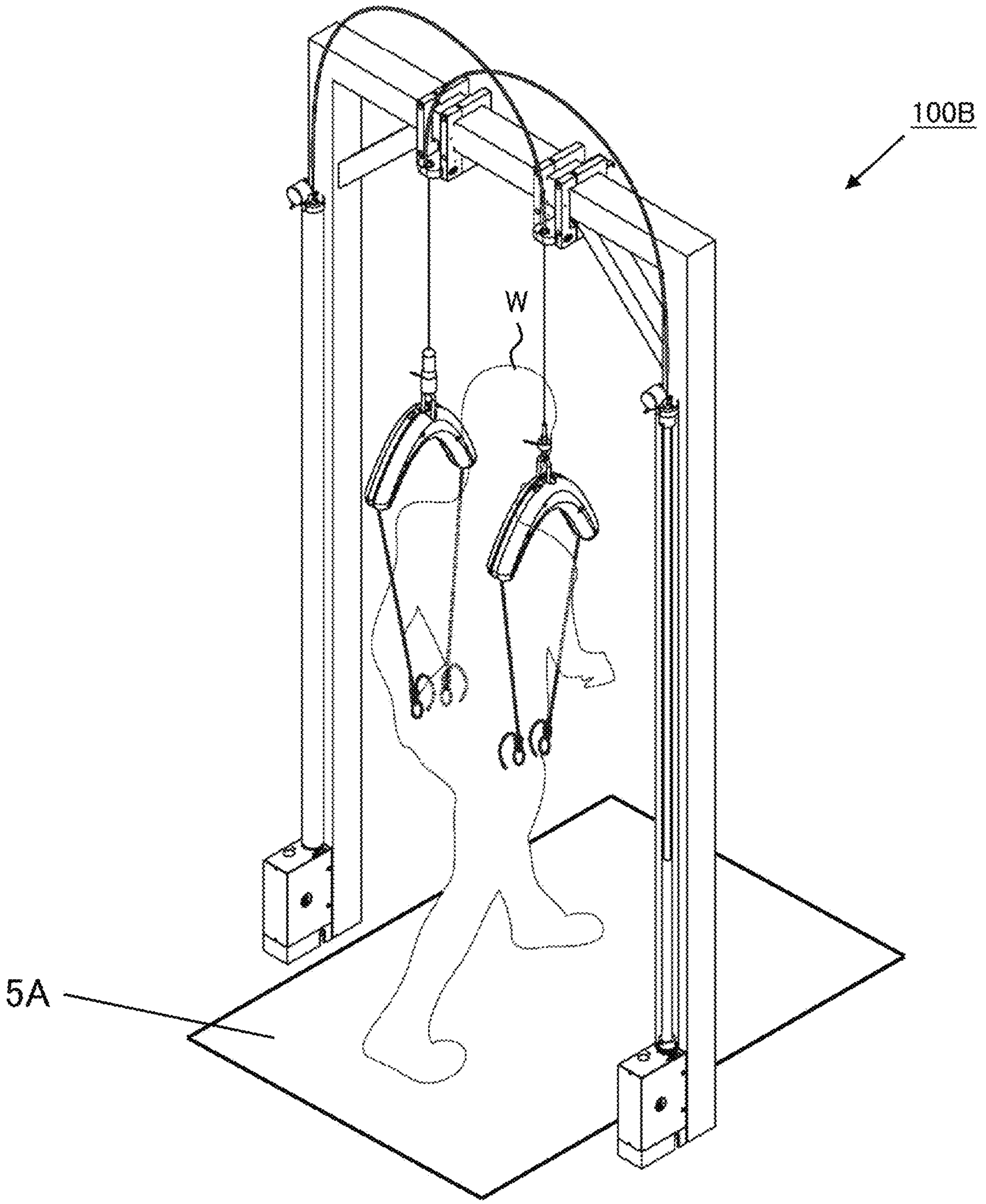
FIG. 12 schematically illustrates an example of a body weight unloading apparatus according to another embodiment.

FIG. 12 schematically illustrates an example of a body weight unloading apparatus 100B according to this modification. The body weight unloading apparatus 100B is constituted similarly to the body weight unloading apparatus 100 according to the above embodiment, except for the sensor 5 being replaced by a sensor 5A. The sensor 5A is configured to measure a central position of the floor reaction force acting on the legs of the user W, as information indicating the imbalance between the floor reaction forces. A pressure distribution sensor, for example, may be used for the sensor 5A. In the case where the user W practices walking movement on a treadmill, the sensor 5A may be incorporated into the treadmill.

In this case, the acquisition of information indicating the imbalance between the floor reaction forces in step S14 may include acquiring the measured central position of the floor reaction force. Also, the first ratio ($R_L(F_{FP})$) may be represented as a ratio of the value of the central position of the floor reaction force to the value of the position of one leg (leg on left side in the embodiment) when based on the position of the other leg (leg on right side in the embodiment). Similarly, the second ratio ($R_R(F_{FP})$) may be represented as a ratio of the value of the central position of the floor reaction force to the value of the position of the other leg when based on the position of the one leg. Note that the value of the position of each leg may be measured by the sensor 5A. Alternatively, another sensor may be used to measure the value of the position of each leg. A motion capture, for example, may be utilized for the other sensor. According to this modification, the sensor need not be disposed in a position directly in contact with the sole of the foot of each leg, thereby encouraging the user W to move naturally. In particular, the constituent elements that are disposed under the sole of the foot are flexible, and enable the user W to take natural steps.

Also, in the above embodiment, the sensors (51, 52) constituting the sensor 5 are disposed on the soles of the feet (e.g., soles of the shoes) of the legs of the user W. However, the disposition of the sensor 5 need not be limited to such an example. Disposition of the sensor 5 may be determined as appropriate according to the type of sensor 5 and the measurement method. In the case of measuring the floor reaction forces respectively acting on the legs of a user W who practices walking movement on a split-type treadmill, for example, the force sensor corresponding to each leg may be incorporated into the treadmill.

Also, in the above embodiment, the sensors (51, 52) are respectively constituted by the first force sensors (511, 521) disposed on the heel side and the second force sensors (512, 522) disposed on the toe side. However, the configuration of the sensors (51, 52) need not be limited to such an example, and may be determined as appropriate according to the embodiment. The number of force sensors constituting the sensors (51, 52) need not be limited to two, and may be one or may be three or more.

Also, in the above embodiment, initial setting of the artificial muscles constituting the actuators (1, 2) is performed by the processing of step 10. This processing of step S10 may be omitted. For example, the initial setting of the artificial muscles may be performed in advance. In the case where the processing of step S10 is omitted, the initial setting unit 615 may be omitted from the software configuration of the control device 6.

4.4

Also, in the above embodiment, in the case where the total of the first unloading force and the second unloading force is maintained at a constant predetermined value, and the total of the designated values of the constant terms ($\beta_R$, $\beta_L$) is greater than or equal to the predetermined value, the control device 6, in step S16, may determine the magnitudes of the unloading forces $F_{ref}$, according to the ratio of the designated values of the constant terms ($\beta_R$, $\beta_L$). The method of determining the unloading forces $F_{ref}$ need not, however, be limited to such an example, and may be determined as appropriate according to the embodiment. For example, the control device 6, in such a case, may employ the designated values of the constant terms ($\beta_R$, $\beta_L$) directly as the unloading forces $F_{ref}$.

Also, in the above embodiment, the control device 6, in step S12, receives designation of the values of parameters of the unloading amount including the constant terms ($\beta_R$, $\beta_L$). The processing for receiving designation of the values of these parameters may be omitted. For example, at least some of the proportional constants ($\alpha_R$, $\alpha_L$) and the constant terms ($\beta_R$, $\beta_L$) may be provided in advance through setting values within the control program 90 or the like. In the case where the processing of step 12 is omitted, the designation reception unit 614 may be omitted from the software configuration of the control device 6.

Also, in the above embodiment, the relationship between the ratios ($R_L(F_{FP})$, $R_R(F_{FP})$) and the unloading forces ($F_{Rref}$, $F_{Lref}$) is given by a linear function that is described by the proportional constants ($\alpha_R$, $\alpha_L$) and the constant terms ($\beta_R$, $\beta_L$). However, the relationship between the ratios ($R_L(F_{FP})$, $R_R(F_{FP})$) and the unloading forces ($F_{Rref}$, $F_{Lref}$) need not be limited to such an example, and may be set as appropriate according to the embodiment. For example, the relationship between the ratios ($R_L(F_{FP})$, $R_R(F_{FP})$) and the unloading forces ($F_{Rref}$, $FF_{Lref}$) may be described by a function other than a linear function, such as n-order function (where n is a natural number of 2 or more), a trigonometric function and a logarithmic function.

Also, in the above embodiment, in the case where the proportional constants ($\alpha_R$, $\alpha_L$) are set to positive values, the second unloading force ($F_{Rref}$) increases (decreases) in response to an increase (decrease) in the first ratio ($R_L(F_{FP})$), and the first unloading force ($F_{Lref}$) increases (decreases) in response to an increase (decrease) in the second ratio ($R_R(F_{FP})$). The method of providing such a relationship need not be limited to such an example. Also, this relationship may be inverted. That is, the second unloading force ($F_{Rref}$) may decrease in response to an increase in the first ratio ($R_L(F_{FP})$), and the second unloading force ($F_{Rref}$) may increase in response to a decrease in the first ratio ($R_L(F_{FP})$). Similarly, the first unloading force ($F_{Lref}$) may decrease in response to an increase in the second ratio ($R_R(F_Fp)$). The first unloading force ($F_{Lref}$) may also increase in response to a decrease in the second ratio ($R_R(F_{FP})$).

Also, in the above embodiment, the second unloading force ($F_{Rref}$) is determined using the first ratio ($R_L(F_{FP})$) as an indicator, and the first unloading force ($F_{Lref}$) is determined using the second ratio ($R_R(F_{FP})$) as an indicator. However, the method of determining the floor reaction forces ($F_{Lref}$ $F_{Rref}$) based on the imbalance between the floor reaction forces need not be limited to such an example. The first unloading force ($F_{Lref}$) may be determined using the first ratio ($R_L(F_{FP})$) as an indicator, and the second unloading force ($F_{Rref}$) may be determined using the second ratio ($R_R(F_{FP})$) as an indicator. The unloading forces may increase (decrease) in response to an increase (decrease) in the respective ratios. Also, this relationship may be inverted.

Also, in the above embodiment, the imbalance between the floor reaction forces is represented by the ratios ($R_L(F_{FP})$, $R_R(F_{FP})$) of the floor reaction forces. However, the method of representing the imbalance between the floor reaction forces need not be limited to such an example, and may be determined as appropriate according to the embodiment. For example, the measurement value of a sensor capable of measuring pressure distribution such as a surface pressure sensor or a pressure distribution sensor may be acquired directly as the imbalance between the floor reaction forces. Alternatively, the imbalance between the floor reaction forces with respect to measurement values that are obtained by a sensor such as an electromyograph or an angle sensor may be modeled in advance. In this case, the imbalance between the floor reaction forces may be computed by inputting measurement values obtained by this sensor to a given model equation.

Also, in the above embodiment, the linear encoders (15, 25) are used in order to respectively measure the muscle contraction rates of the artificial muscles constituting the actuators (1, 2). The linear encoders (15, 25) are respectively disposed in the connecting portions between the actuators (1, 2) and the support members (3, 4). However, the type and disposition of the sensors for measuring the muscle contraction rates need not be limited to such an example as long as the muscle contraction rates can be measured, and may be determined as appropriate according to the embodiment. Encoders other than linear encoders may be utilized for the sensors for measuring the muscle contraction rates.

Also, in the above embodiment, the load cells (30, 40) are used in order to measure the unloading forces respectively acting on the legs. The load cells (30, 40) are respectively disposed in the joining portions of the cables (35, 45) and the first ropes (37, 47) in the support members (3, 4). However, the type and disposition of the sensors for measuring the unloading forces respectively acting on the legs need not be limited to such an example as long as the unloading forces on the legs can be measured, and may be determined as appropriate according to the embodiment.

4.5

In the above embodiment, the control device 6 outputs the unloading forces at magnitudes determined according to the imbalance between the floor reaction forces, without consideration for the gait cycle of the user W. However, the timing for outputting the unloading forces need not be limited to such an example. The control device 6 may be configured to adjust the timing for generating the first unloading force and the second unloading force at respectively determined magnitudes, according to the gait cycle.

Figure 13:
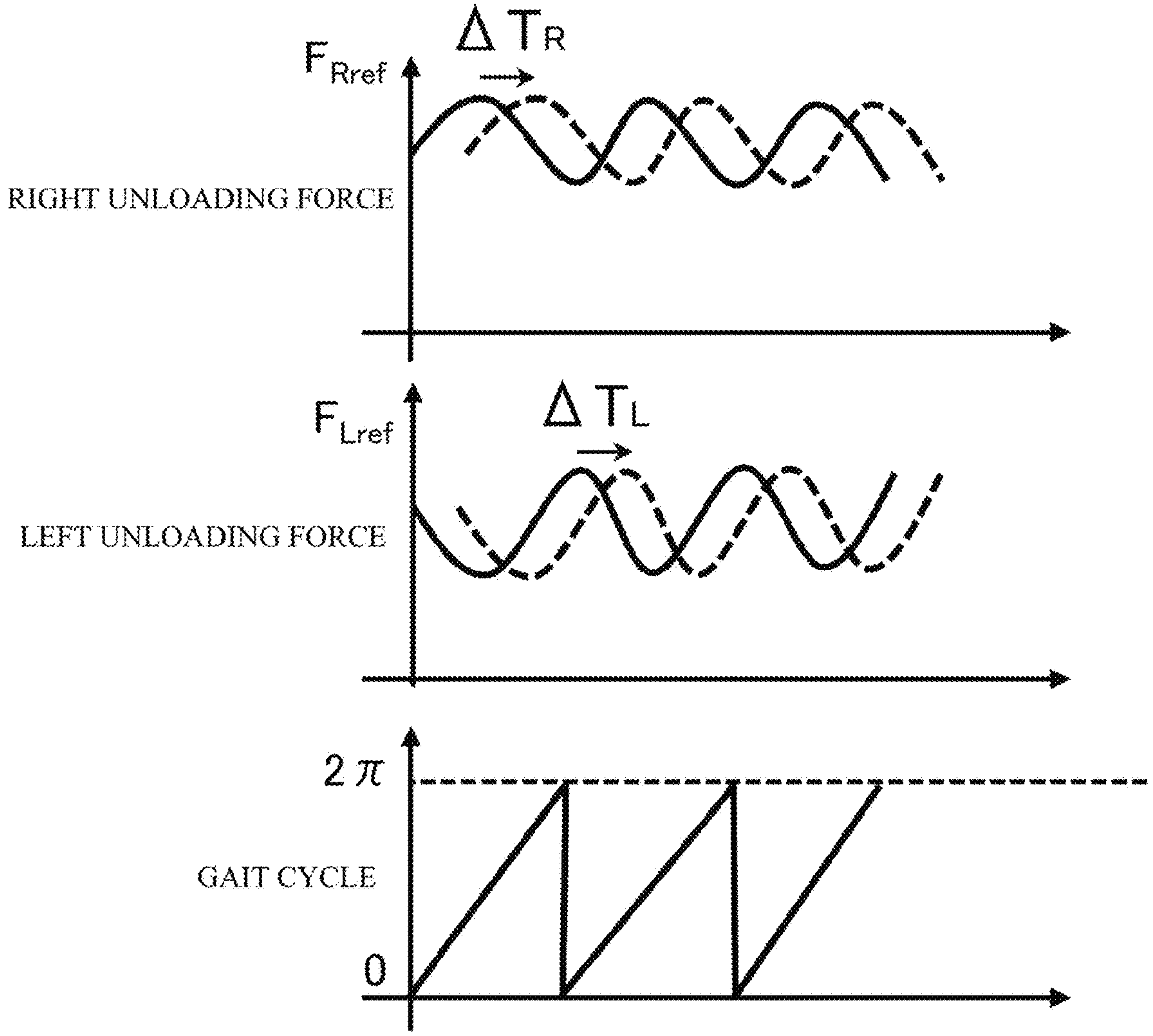
FIG. 13 illustrates an example of the relationship between the magnitude of each unloading force and a gait cycle.

FIG. 13 illustrates an example of the relationship between the magnitude of each unloading force and the gait cycle. In this modification, the control unit 61 acquires information indicating the gait cycle (hereinafter, also referred to as cycle information). The method of acquiring the cycle information need not be particularly limited, and may be selected as appropriate according to the embodiment. The gait cycle may be measured by another sensor such as a motion sensor, for example. Alternatively, the control device 6 may be provided with a phase estimator configured to estimate the gait cycle as a software module. That is, the control unit 61 may acquire cycle information by estimating the gait cycle of the user as appropriate. A known method may be employed as the method of estimating the gait cycle. As an example, the control unit 61 may estimate the gait cycle, based on measurement data obtained by the other sensor. As another example, in the case where the user W is engaging in the walking motion on the treadmill, the gait cycle can be estimated from the speed of the treadmill and the timing of heel strikes. Also, in the above embodiment, heel strikes of the feet can be detected based on the output of the force sensors (511, 512, 521, 522) of the sensor 5. In this case, the control unit 61 may acquire information indicating the speed of the treadmill directly from the treadmill or through input by the operator. Also, the control unit 61 may detect heel strikes of the feet based on the output of the sensor 5. The control unit 61 then may estimate the gait cycle from the speed of the treadmill and the timing of the heel strikes.

Next, the control unit 61 determines the magnitudes of the unloading forces to be output at the respective timings, according to the gait cycle that is indicated by the obtained cycle information. As an example, the control unit 61, in step S16, determines the magnitudes of the unloading forces to be output at respective timings, by executing the computation of the following Formula 14, instead of the computation of the above Formula 4.

Formula 14

$$F_{tref}(t) = \begin{bmatrix} F_{Lref}(t - \Delta T_L) \\ F_{Rref}(t - \Delta T_R) \end{bmatrix} \quad \text{(Formula 14)}$$

$F_{tref}$ corresponds to $F_{ref}$ and denotes the target value 70 that is computed. $\Delta T_L$ denotes the adjustment amount of the output timing of the first unloading force with respect to the gait cycle, and $\Delta T_R$ denotes the adjustment amount of the output timing of the second unloading force. The adjustment amounts may be designated through input by the operator. Alternatively, the adjustment amounts may be determined as appropriate according to the gait cycle. The processing by the control device 6 other than the above may be similar to the above embodiment. As shown in FIG. 13, the control device 6 is thereby able to output the unloading forces with respective delays of $\Delta T_L$ and $\Delta T_R$.

According to this modification, the control device 6 is able to temporally vary the timings for outputting the unloading forces, by adjusting $\Delta T_L$ and $\Delta T_R$ By as appropriate. The pattern of each unloading force with respect to the gait cycle can thereby be freely adjusted, and, as a result, the effect of allowing the user W to engage in training for restoring a natural gait that is bilaterally symmetrical can be expected. For example, by relatively changing the output timing of the unloading force on the leg on the paralyzed side, the user W can be encouraged to walk with a natural gait that is bilaterally symmetrical. Note that, in the above example, the timings for outputting the unloading forces are respectively delayed by $\Delta T_L$ and $\Delta T_R$. However, the timing adjustment method need not be limited to such an example. The control device 6 may determine the adjustment amount so as to bring forward the timing for outputting each unloading force.

4.6

Also, in the above embodiment, the control device 6 may be configured to increase at least one of the first unloading force and the second unloading force by a sensory threshold at a predetermined timing of the gait cycle.

Figure 14:
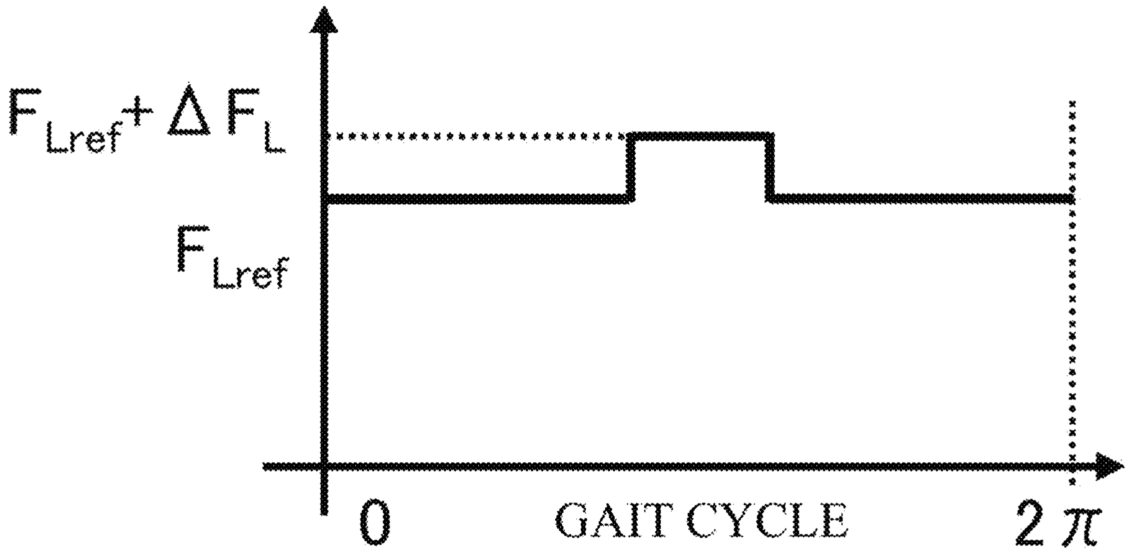
FIG. 14 illustrates an example of the timing for adding an unloading force of a sensory threshold.

FIG. 14 illustrates an example of a timing for adding an unloading force of a sensory threshold ($\Delta F_L$) to the first unloading force ($F_{Lref}$). Note that, in FIG. 14 the magnitude of the first unloading force ($F_{Lref}$) is represented as a constant value, for convenience of description, but may be determined by a method of the above embodiment or modifications. An unloading force of the sensory threshold may also similarly be added to the second unloading force. In this modification, the control unit 61 acquires cycle information indicating the gait cycle. The cycle information may be acquired with a method similar to the above modification 4.5. The control unit 61 then increases the magnitude of the target unloading force by the sensory threshold, in response to the gait cycle being at a predetermined timing. The processing by the control device 6 other than the above may be similar to the above embodiment.

The sensory threshold may be determined as appropriate such that the user W is able to feel the change in the unloading forces through somatic sensation. The amount of change may be somatically perceivable but minute. The amount of change is greater than the somatically perceivable threshold. The threshold of the variable amount may be determined beforehand. As an example, the threshold of the amount of change may be determined by a method such as the following. First, an unloading force of an arbitrary magnitude is set to be applied to the user W. For example, as shown in FIG. 14, the magnitude of the unloading force (first unloading force illustrated in FIG. 14) may be a constant value. The constant value may be the average value of the unloading forces that are applied in one gait cycle. The value of the amount of change is then gradually increased, and it is confirmed with the user W as to whether he or she perceives the variation in the unloading amount. The value that can be perceived by the user W can thereby be determined as the sensory threshold of the amount of change. Also, the timing for adding an unloading force of the sensory threshold may be freely determined. As an example, an unloading force of the sensory threshold may be added at the timing for instructing the start of motion for striking the ground with each foot. This timing may be designated through input by the operator (e.g., therapist). According to this modification, the user W can be taught the walking motion timing through somatic sensation. In the case where the user W is engaged in training for restoring a natural gait that is bilaterally symmetrical, this teaching of the walking motion timing through somatic sensation may be carried out when improvement in the bilateral symmetry of the gait is not evident. In this case, improvement in the symmetry of the walking motion can be achieved, without disturbing the pattern of the unloading forces that are applied to the legs.

Note that, as the method of teaching the walking motion timing, methods using video or sound, for example, are conceivable, apart from this method using somatic sensation. In the case of teaching the walking motion timing through video, the user W must pay close attention to the video. Also, in the case of teaching through sound, the timing will be taught with different types of sound for the left and right legs, and the user W must identify those types of sound. Accordingly, in the case where the user W is an elderly person or a patient with a central nervous system disorder, for example, the load involved in the user W perceiving the respective teaching is high, and it could possibly be difficult to get the user W to perform the walking motion as taught. Also, when the attention of the user W is directed to sounds, verbal communication with the person who is teaching the movement such as a gait practice assistant or therapist could possibly be hindered. Furthermore, teaching through sound is difficult in the case where speech or hearing disorders are present. In contrast, according to this modification, the user W can be taught the walking motion timing through somatic sensation, without increasing the cognitive load as described above. Thus, it can be expected to shorten the time required to teach the walking motion timing and to improve safety, compared to other methods.

5. Working Examples

Next, working examples will be described. A body weight unloading apparatus having a similar configuration to the present embodiment was produced, and gait practice training was carried out on a treadmill with a hemiplegic patient.

First Working Example

In the first embodiment, the proximal ends of the support members were fitted to a test subject whose left leg was paralyzed and whose right leg was unaffected, and gait practice training was carried out while partially unloading the body weight of the test subject, with a similar processing procedure to the above embodiment. The total value of the unloading forces on the legs was set to a constant value (constant value set one of 7.5%, 10% or 15% of body weight; different depending on the conditions). The unloading force (unloading amount) acting on each leg was adjusted, by changing the constant terms of Formula 4. The walking speed of the treadmill was adjusted to a speed at which the test subject could walk comfortably in a range of 1 km/h to 2 km/h. While training was being implemented, the standing time on the unaffected side (right leg) and the standing time on the paralyzed side (left leg) were each measured, and the ratio of the standing time on the paralyzed side to the standing time on the unaffected side was computed using the obtained measurement values. Note that the bilateral difference of the standing times decreases as the ratio of the standing times approaches 1, indicating that the bilateral balance of the walking movement is good, that is, the gait is natural.

Figure 15:
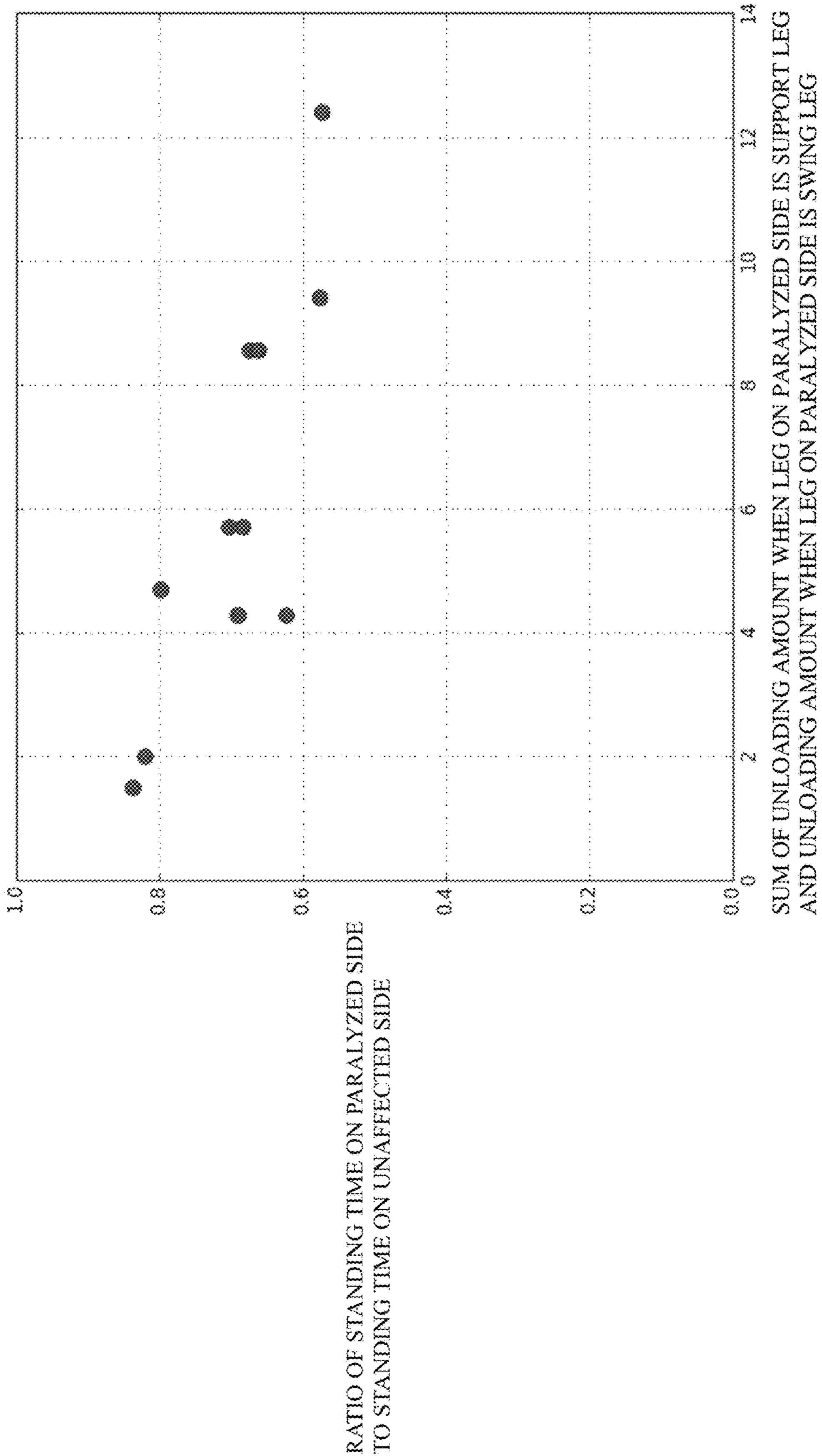
FIG. 15 shows the result of measuring the balance of the gait cycle of a test subject when a walking movement training program is implemented, utilizing the body weight unloading apparatus according to the embodiment.
Figure 16:
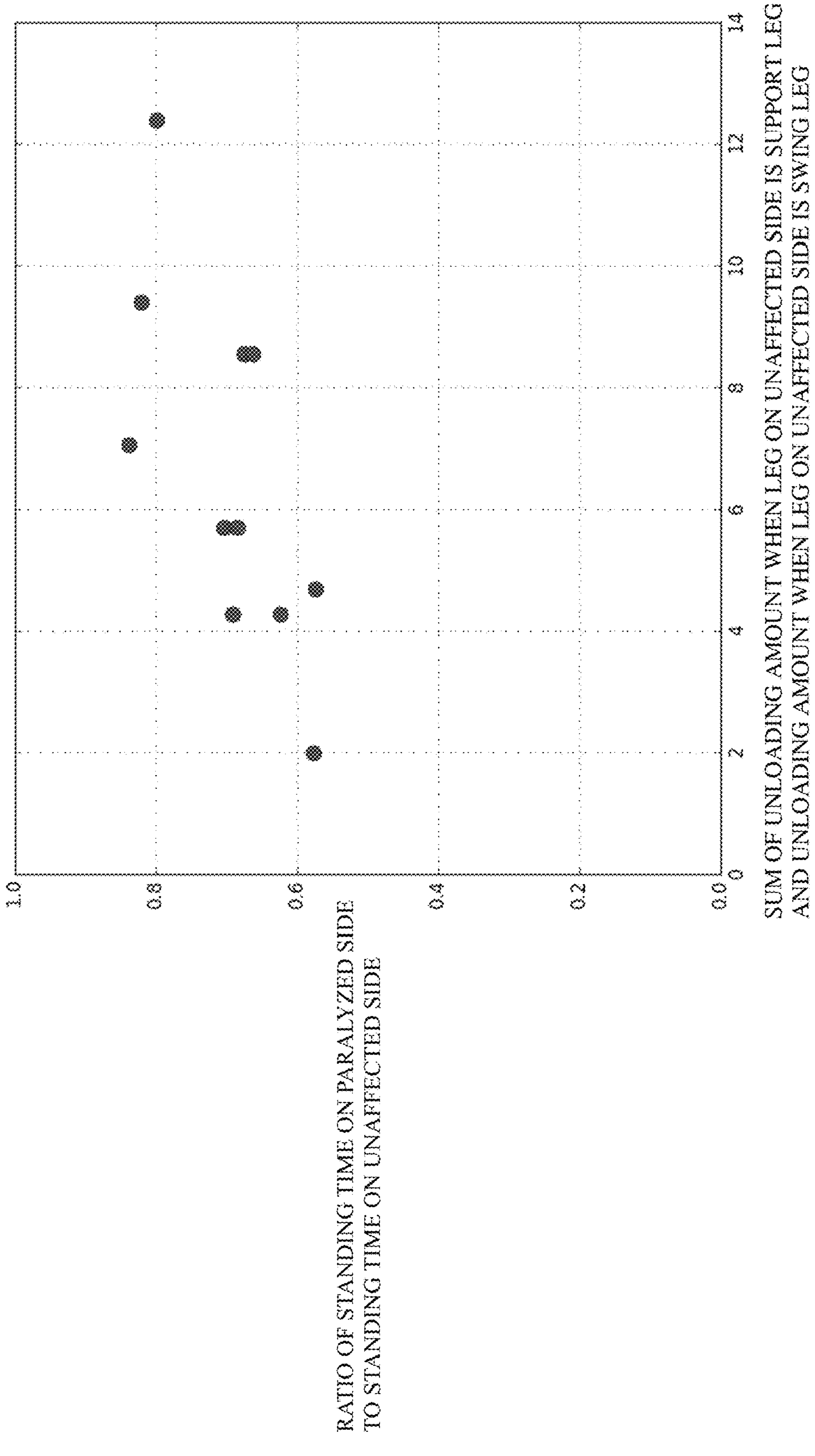
FIG. 16 shows the result of measuring the balance of the gait cycle of a test subject when a walking movement training program is implemented, utilizing the body weight unloading apparatus according to the embodiment.

FIGS. 15 and 16 show the computation results of the ratio of the standing time on the paralyzed side to the standing time on the unaffected side. The horizontal axis of the graph in FIG. 15 shows the sum of the unloading amount when the leg on the paralyzed side is the support leg and the unloading amount when the leg on the paralyzed side is the swing leg. The horizontal axis of the graph in FIG. 16 shows the sum of the unloading amount when the leg on the unaffected side is the support leg and the unloading amount when the leg on the unaffected side is the swing leg. In FIG. 15, the ratio of standing times deteriorates as the sum of the unloading amounts increases, whereas, in FIG. 16, the ratio of standing times improves as the sum of the unloading amounts increases. From the computation results shown in FIGS. 15 and 16 it was found that by reducing the unloading amount on the leg on the paralyzed side and increasing the unloading amount on the leg on the unaffected side, the bilateral ratio of standing times can be improved and the test subject can be encouraged to walk naturally. Also, in the above embodiment, such operation of the unloading forces can be easily achieved by adjusting the constant terms.

Second Working Example and Reference Example

In a second working example and a reference example, similarly to the first embodiment, the proximal ends of the support members were fitted to a test subject whose left leg was paralyzed and whose right leg was unaffected, and gait practice training was carried out on a treadmill while partially unloading the body weight of the test subject with a similar processing procedure to the above embodiment. With the second embodiment and the reference example, five trials were carried out. As a common condition for the five trials, the total value of the unloading force on the legs was set to a constant value (15% of body weight).

In the first trial, as a reference example, the method of determining the unloading forces was changed, and the unloading force on each leg was set to the same constant value. On the other hand, in the second to fifth trials, as working examples, the unloading forces were determined similarly to the above embodiment. In the second trial, the values of the constant terms were set to “0”. In the third trial, the value of the constant term on the unaffected side was set to 45% of the total value of the unloading forces, and the value of the constant term on the paralyzed side was set to “0”. In the fourth trial, the value of the constant term on the paralyzed side was set to 45% of the total value of the unloading forces, and the value of the constant term on the unaffected side was set to “0”. In the fifth trial, the values of the constant terms of the unaffected side and the paralyzed side were each set to 22.5% of the total value of the unloading forces. While training was being implemented in each trial, the standing time on the unaffected side (right leg) and the standing time on the paralyzed side (left leg) were measured, and the ratio of the standing time on the paralyzed side to the standing time on the unaffected side was computed using the obtained measurement values.

Figure 17:
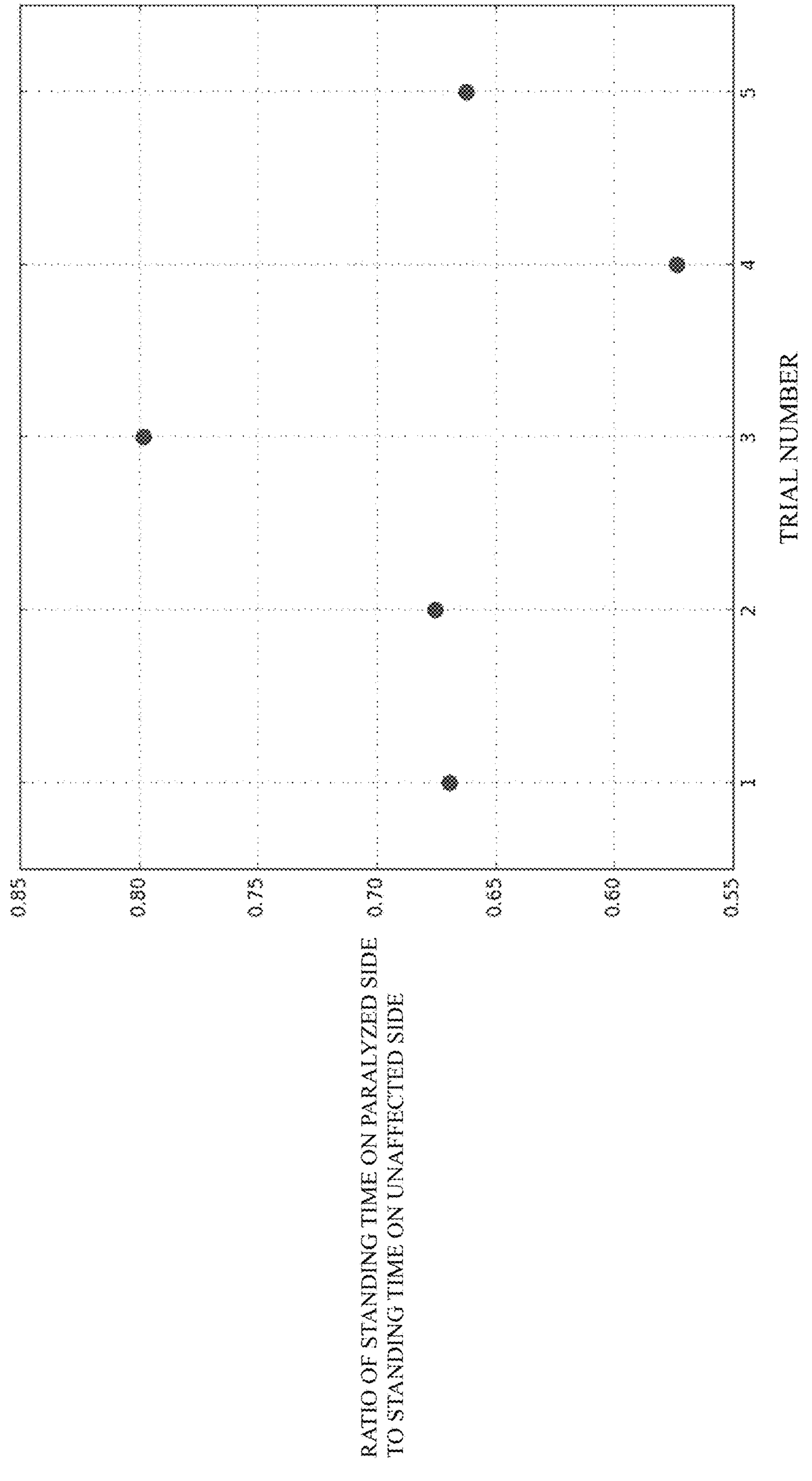
FIG. 17 shows the result of measuring the balance of the gait cycle of a test subject when a walking movement training program is implemented, utilizing the body weight unloading apparatus according to the embodiment.

FIG. 17 shows the computation results of the ratio of the standing time on the paralyzed side to the standing time on the unaffected side in each trial. The horizontal axis in FIG. 17 shows the numbers of the trials. As shown in FIG. 17, the bilateral ratio of standing times improved the most in the third trial in which the unloading amount on the unaffected side was increased, and the bilateral ratio of standing times deteriorated the most in the fourth trial in which the unloading amount on the paralyzed side was increased. From these results, it was found that by reducing the unloading amount on the leg on the paralyzed side and increasing the unloading amount on the leg on the unaffected side, similarly to the first embodiment, the bilateral ratio of the standing times can be improved and the test subject can be encouraged to walk naturally. Also, it was found that the method of determining the unloading forces according to the above embodiment and the setting method in which the value of the constant term is reduced on the paralyzed side and the value of the constant term is increased on the unaffected side were effective in encouraging the test subject to walk in a natural manner.

LIST OF REFERENCE NUMERALS

100 Body weight unloading apparatus
W User
1 First actuator
11 Valve
15 Linear encoder
2 Second actuator
21 Valve
25 Linear encoder
CP Compressor
3 First support member
30 Load cell
31 Proximal end
32 Distal end
35 Cable
351 Proximal end
352 Distal end
36 Coupler
361 First end part
362 Second end part
363 Raised part
37 First rope
370 Rope ascender
371 One end
372 Other end
373 Fastener
38 Second rope
380 Fastener
381 Proximal end
382 Distal end
39 Third rope
390 Fastener
391 Proximal end
392 Distal end
4 Second support member
40 Load cell
41 Proximal end
42 Distal end
45 Cable
451 Proximal end
452 Distal end
46 Coupler
461 First end part
462 Second end part
463 Raised part
47 First rope
48 Second rope
481 Proximal end
482 Distal end
49 Third rope
491 Proximal end
492 Distal end
FL Suspender
F1, F2 Column part
F3 Beam part
F4, F5 Holding part
5 Sensor
51 First sensor
511 First force sensor
512 Second force sensor
52 Second sensor
521 First force sensor
522 Second force sensor
6 Control device
61 Control unit
62 Storage unit
63 External interface
64 Input device
65 Output device
66 Drive
90 Control program
91 Storage medium
611 Information acquisition unit
612 Unloading force determination unit
613 Unloading instruction unit
614 Designation reception unit
615 Initial setting unit
70 Target value
71 Feedforward control
72 Feedback control

The invention claimed is:

1. A body weight unloading apparatus for unloading a body weight of a user, comprising:

a first actuator;

a second actuator;

a first support member having a proximal end and a distal end, whereby the distal end is connected to the first actuator, and the proximal end is to be fitted to the user such that a first unloading force supplied by the first actuator acts on one leg of the user;

a second support member having a proximal end and a distal end, whereby the distal end is connected to the second actuator, and the proximal end is to be fitted to the user such that a second unloading force supplied by the second actuator acts on the other leg of the user;

a sensor configured to measure information indicating an imbalance between floor reaction forces respectively acting on the legs of the user; and a control device configured to control operations of the first actuator and the second actuator, wherein the control device is configured to:

acquire the information indicating the imbalance between the floor reaction forces measured by the sensor, determine respective magnitudes of the first unloading force and the second unloading force, according to the imbalance between the floor reaction forces indicated by the acquired information, and control the first actuator and the second actuator, so as to generate the first unloading force and the second unloading force at the respectively determined magnitudes, wherein the imbalance between the floor reaction forces is represented by a first ratio of the floor reaction force acting on the one leg to a total of the floor reaction forces acting on both legs, and a second ratio of the floor reaction force acting on the other leg to a total of the floor reaction forces acting on both legs, wherein the body weight unloading apparatus is configured to determine the respective magnitudes of the first unloading force and the second unloading force by determining the magnitude of the second unloading force according to the first ratio, and determining the magnitude of the first unloading force according to the second ratio, and wherein determining the magnitude of the second unloading force according to the first ratio is constituted by:

computing a first product of the first ratio and a first proportional constant, computing a first sum of the computed first product and a first constant term, and employing the computed first sum as a value of the second unloading force, and determining the magnitude of the first unloading force according to the second ratio is constituted by:

computing a second product of the second ratio and a second proportional constant, computing a second sum of the computed second product and a second constant term, and employing the computed second sum as a value of the first unloading force.

2. The body weight unloading apparatus according to claim 1, wherein:

determining the magnitude of the second unloading force according to the first ratio comprises:

increasing the second unloading force as the first ratio increases, and reducing the second unloading force as the first ratio decreases, and determining the magnitude of the first unloading force according to the second ratio comprises:

increasing the first unloading force as the second ratio increases, and reducing the first unloading force as the second ratio decreases.

3. The body weight unloading apparatus according to claim 1, wherein the control device is further configured to receive designation of respective values of the first constant term and the second constant term.

4. The body weight unloading apparatus according to claim 3, wherein determining the respective magnitudes of the first unloading force and the second unloading force includes maintaining a total of the first unloading force and the second unloading force at a constant predetermined value, and in a case where a total of the respective designated values of the first constant term and the second constant term is greater than or equal to the predetermined value, the control device determines the respective magnitudes of the first unloading force and the second unloading force according to a ratio of the respective designated values of the first constant term and the second constant term.

5. The body weight unloading apparatus according to claim 1, wherein:

the sensor is constituted by a first sensor configured to measure a first floor reaction force acting on a sole of a foot of the one leg of the user and a second sensor configured to measure a second floor reaction force acting on a sole of a foot of the other leg of the user, acquiring information indicating the imbalance between the floor reaction forces includes acquiring values of the first floor reaction force and the second floor reaction force respectively measured by the first sensor and the second sensor, the first ratio is a ratio of a value of the first floor reaction force to a total value of the first floor reaction force and the second floor reaction force, and the second ratio is a ratio of a value of the second floor reaction force to a total value of the first floor reaction force and the second floor reaction force.

6. The body weight unloading apparatus according to claim 5, wherein the first sensor and the second sensor each include a first force sensor disposed on a heel side of the sole of the foot and a second force sensor disposed on a toe side of the sole of the foot.

7. The body weight unloading apparatus according to claim 1, wherein:

the sensor is configured to measure a central position of the floor reaction force acting on each of the legs of the user as information indicating the imbalance between the floor reaction forces, acquiring information indicating the imbalance between the floor reaction forces includes acquiring a value of the measured central position of the floor reaction force, the first ratio is a ratio of the value of the central position of the floor reaction force to a value of the position of the one leg when based on the position of the other leg, and the second ratio is a ratio of the value of the central position of the floor reaction force to a value of the position of the other leg when based on the position of the one leg.

8. The body weight unloading apparatus according to claim 1, wherein the control device is further configured to adjust timings for generating the first unloading force and the second unloading force at the respectively determined magnitudes, according to a gait cycle.

9. The body weight unloading apparatus according to claim 1, wherein the control device is further configured to increase at least one of the first unloading force and the second unloading force by a sensory threshold at a predetermined timing of a gait cycle.

10. The body weight unloading apparatus according to claim 1, wherein the first actuator and the second actuator are each constituted by a pneumatic artificial muscle.

11. The body weight unloading apparatus according to claim 10, wherein the pneumatic artificial muscle of each of the first actuator and the second actuator is configured to be initially set by applying compressed air at a predetermined pressure, in a state where the proximal end of each of the first support member and the second support member is fitted to the user, and causing the each of the first support member and the second support member to be tensioned such that a muscle contraction rate attains a predetermined value.

12. The body weight unloading apparatus according to claim 1, further comprising a suspender suspending the first support member and the second support member such that the proximal ends of the first support member and the second support member hang down from upward of the user, wherein the first support member and the second support member each include:

a cable having a proximal end and a distal end, and suspended by the suspender;

a coupler formed to have a dog-legged shape, and having a first end part, a second end part and a raised part disposed between the first end part and the second end part and oriented upward;

a first rope coupling the raised part of the coupler and the proximal end of the cable, and configured to be adjustable in length;

a second rope having a proximal end and a distal end, whereby the distal end is joined to the first end part of the coupler; and a third rope having a proximal end and a distal end, whereby the distal end is joined to the second end part of the coupler, wherein:

the distal end of the cable of the first support member constitutes the distal end of the first support member and the distal end of the cable of the second support member constitutes the distal end of the second support member, and the respective proximal ends of the second rope and the third rope of each of the first support member and the second support member constitute the proximal end of each of the first support member and the second support member.

13. The body weight unloading apparatus according to claim 12, wherein the suspender includes a pair of column parts, and the body weight unloading apparatus further comprises a pair of restraints configured to retrain movement of the coupler of each of the first support member and the second support member , by respectively coupling the coupler of each of the first support member and the second support member to each of the pair of column parts.

* * * * *